US007403981B2

(12) United States Patent
Master et al.

(10) Patent No.: US 7,403,981 B2
(45) Date of Patent: Jul. 22, 2008

(54) APPARATUS AND METHOD FOR ADAPTIVE MULTIMEDIA RECEPTION AND TRANSMISSION IN COMMUNICATION ENVIRONMENTS

(75) Inventors: Paul L. Master, Sunnyvale, CA (US); Bohumir Uvacek, Mountain View, CA (US)

(73) Assignee: Quicksilver Technology, Inc., San Jose, CA (US)

( * ) Notice: Subject to any disclaimer, the term of this patent is extended or adjusted under 35 U.S.C. 154(b) by 1187 days.

(21) Appl. No.: 10/040,100

(22) Filed: Jan. 4, 2002

(65) Prior Publication Data

US 2003/0140123 A1    Jul. 24, 2003

(51) Int. Cl.
*G06F 15/177* (2006.01)
(52) U.S. Cl. .................. 709/220; 709/223; 709/228
(58) Field of Classification Search ................. 709/220, 709/228, 223
See application file for complete search history.

(56) References Cited

U.S. PATENT DOCUMENTS

| | | | |
|---|---|---|---|
| 5,931,918 A | 8/1999 | Row et al. | |
| 6,175,854 B1 | 1/2001 | Bretscher | |
| 6,289,488 B1 | 9/2001 | Dave et al. | |
| 6,349,394 B1 | 2/2002 | Brock et al. | |
| 6,360,259 B1 | 3/2002 | Bradley | |
| 6,411,612 B1 * | 6/2002 | Halford et al. | 370/347 |
| 6,430,624 B1 * | 8/2002 | Jamtgaard et al. | 709/246 |
| 6,473,609 B1 * | 10/2002 | Schwartz et al. | 455/406 |
| 6,563,891 B1 * | 5/2003 | Eriksson et al. | 375/345 |
| 6,618,434 B2 * | 9/2003 | Heidari-Bateni et al. | 375/148 |
| 6,871,236 B2 * | 3/2005 | Fishman et al. | 709/246 |
| 2001/0003191 A1 * | 6/2001 | Kovacs et al. | 709/226 |
| 2002/0107962 A1 | 8/2002 | Richter et al. | |
| 2003/0018700 A1 * | 1/2003 | Giroti et al. | 709/201 |
| 2003/0026242 A1 * | 2/2003 | Jokinen et al. | 370/350 |
| 2005/0198199 A1 * | 9/2005 | Dowling | 709/217 |

* cited by examiner

*Primary Examiner*—John Follansbee
*Assistant Examiner*—Nghi V Tran
(74) *Attorney, Agent, or Firm*—Marc S. Kaufman; NixonPeabody, LLP

(57) ABSTRACT

The present invention provides a method and apparatus for configuration of adaptive integrated circuitry, to provide one or more operating modes or other functionality in a communication device, such as a cellular telephone, a GSM telephone, another type of mobile telephone or mobile station, or any other type of media communication device, including video, voice or radio, or other forms of multimedia. The adaptive integrated circuitry is configured and reconfigured for multiple tasks, such as channel acquisition, voice transmission, or multimedia and other data processing. In the preferred embodiment, the configuration and reconfiguration occurs to adaptively optimize the performance of the particular activity over time, such as to increase the speed of channel acquisition, increase throughput rates, increase perceived voice and media quality, and decrease the rate of dropped communication sessions.

45 Claims, 13 Drawing Sheets

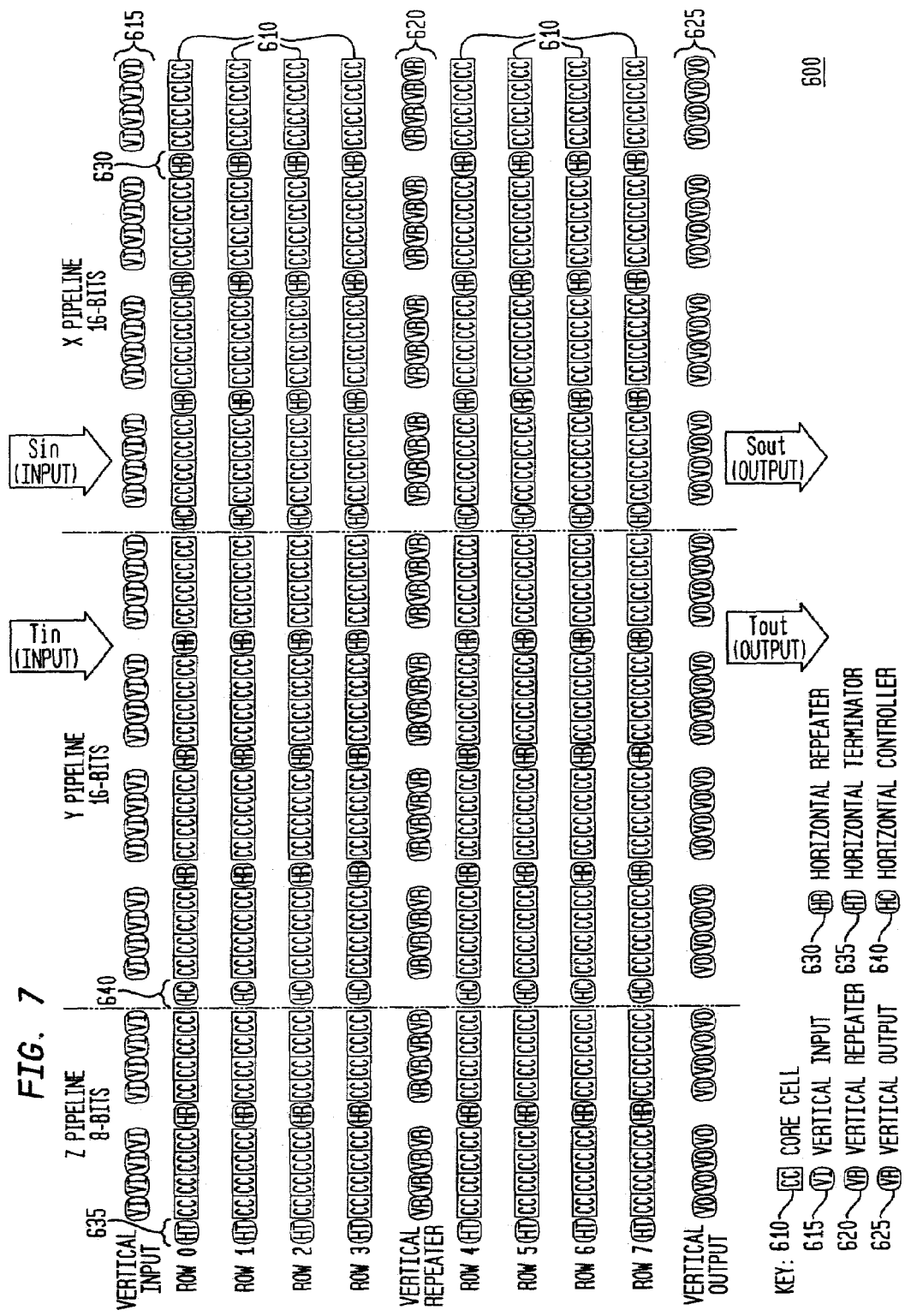

APPARATUS AND METHOD FOR ADAPTIVE MULTIMEDIA RECEPTION AND TRANSMISSION IN COMMUNICATION ENVIRONMENTS

FIELD OF THE INVENTION

The present invention relates, in general, to integrated circuits utilized in communication environments, such as in cellular or GSM communication systems. More particularly, the present invention relates to an apparatus and method for adaptive multimedia reception and transmission, preferably in mobile communication systems, in which adaptive integrated circuitry having fixed, application specific computational elements is configured and reconfigured for multiple tasks, such as channel acquisition, voice transmission, or data processing.

CROSS-REFERENCE TO RELATED APPLICATIONS

This application is related to Paul L. Master et al., U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements", filed Mar. 22, 2001, commonly assigned to QuickSilver Technology, Inc., and incorporated by reference herein, with priority claimed for all commonly disclosed subject matter (the "first related application").

This application is related to Paul L. Master et al., U.S. patent application Ser. No. 09/997,530, entitled "Apparatus, System and Method For Configuration Of Adaptive Integrated Circuitry Having Fixed, Application Specific Computational Elements", filed Nov. 30, 2001, commonly assigned to QuickSilver Technology, Inc., and incorporated by reference herein, with priority claimed for all commonly disclosed subject matter (the "second related application").

BACKGROUND OF THE INVENTION

The first related application discloses a new form or type of integrated circuitry which effectively and efficiently combines and maximizes the various advantages of processors, application specific integrated circuits ("ASICs"), and field programmable gate arrays ("FPGAs"), while minimizing potential disadvantages. The first related application illustrates a new form or type of integrated circuit ("IC"), referred to as an adaptive computing engine ("ACE"), which provides the programming flexibility of a processor, the post-fabrication flexibility of FPGAs, and the high speed and high utilization factors of an ASIC. This ACE integrated circuitry is readily reconfigurable, is capable of having corresponding, multiple modes of operation, and further minimizes power consumption while increasing performance, with particular suitability for low power applications, such as for use in hand-held and other battery-powered devices.

This ACE integrated circuitry, however, without something more, is essentially an empty or "blank" device. More particularly, configuration information (or, equivalently, adaptation information) is required to generate, in advance or in real-time (or potentially at a slower rate), the adaptations (configurations and reconfigurations) which provide and create one or more operating modes for the ACE circuit, such as wireless communication, radio reception, personal digital assistance ("PDA"), MP3 music playing, or any other desired functions.

The second related application discloses a preferred system embodiment that includes an ACE integrated circuit coupled with one or more sets of configuration information. This configuration (adaptation) information is required to generate, in advance or in real-time (or potentially at a slower rate), the configurations and reconfigurations which provide and create one or more operating modes for the ACE circuit, such as wireless communication, radio reception, personal digital assistance ("PDA"), MP3 or MP4 music playing, or any other desired functions. Various methods, apparatuses and systems are also illustrated in the second related application for generating and providing configuration information for an ACE integrated circuit, for determining ACE reconfiguration capacity or capability, for providing secure and authorized configurations, and for providing appropriate monitoring of configuration and content usage.

Communication systems present a unique opportunity for applications of the adaptive computing engine form of integrated circuitry. Wireless communication systems, including cellular, code division multiple access ("CDMA", and its variants, such as PCS), and GSM (global system for mobile communications (formerly, Groupe Speciale Mobile)), or any other channel-based communication system, may benefit from the use of ACE devices.

As a consequence, a need remains for an apparatus and method for adaptive multimedia reception and transmission in mobile communication systems, in which adaptive integrated circuitry is configured and reconfigured for multiple tasks, such as channel acquisition, voice transmission, or multimedia and other data processing.

SUMMARY OF THE INVENTION

The adaptive computing engine ("ACE") circuit of the present invention, for adaptive or reconfigurable computing, includes a plurality of differing, heterogeneous computational elements coupled to an interconnection network (rather than the same, homogeneous repeating and arrayed units of FPGAs). The plurality of heterogeneous computational elements include corresponding computational elements having fixed and differing architectures; such as fixed architectures for different functions such as memory, addition, multiplication, complex multiplication, subtraction, synchronization, queuing, over sampling, under sampling, configuration, reconfiguration, control, input, output, routing, and field programmability. In response to configuration information, the interconnection network is operative, in advance, in real-time or potentially slower, to configure and reconfigure the plurality of heterogeneous computational elements for a plurality of different functional modes, including linear algorithmic operations, non-linear algorithmic operations, finite state machine operations, memory operations, and bit-level manipulations. In turn, this configuration and reconfiguration of heterogeneous computational elements, forming various computational units and adaptive matrices, generates the selected, higher-level operating mode of the ACE integrated circuit, for the performance of a wide variety of tasks.

The present invention provides a method and apparatus for configuration of such adaptive integrated circuitry, to provide one or more operating modes or other functionality in a communication device, such as a cellular telephone, a GSM telephone, another type of mobile telephone or mobile station, or any other type of media communication device, including video, voice or radio, or other forms of multimedia. The adaptive integrated circuitry is adapted (configured and reconfigured) for multiple tasks, such as channel acquisition, voice transmission, or multimedia and other data processing.

In the preferred embodiment, the configuration and reconfiguration occurs to adaptively optimize the performance of the particular activity over time, such as to increase the speed of channel acquisition, increase throughput rates, increase perceived voice and media quality, and decrease the rate of dropped communication sessions.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 7 is a block diagram illustrating, in detail, a preferred adaptive logic processor computational unit having a plurality of fixed computational elements, in accordance with the present invention.

DETAILED DESCRIPTION OF THE INVENTION

Figure 1:
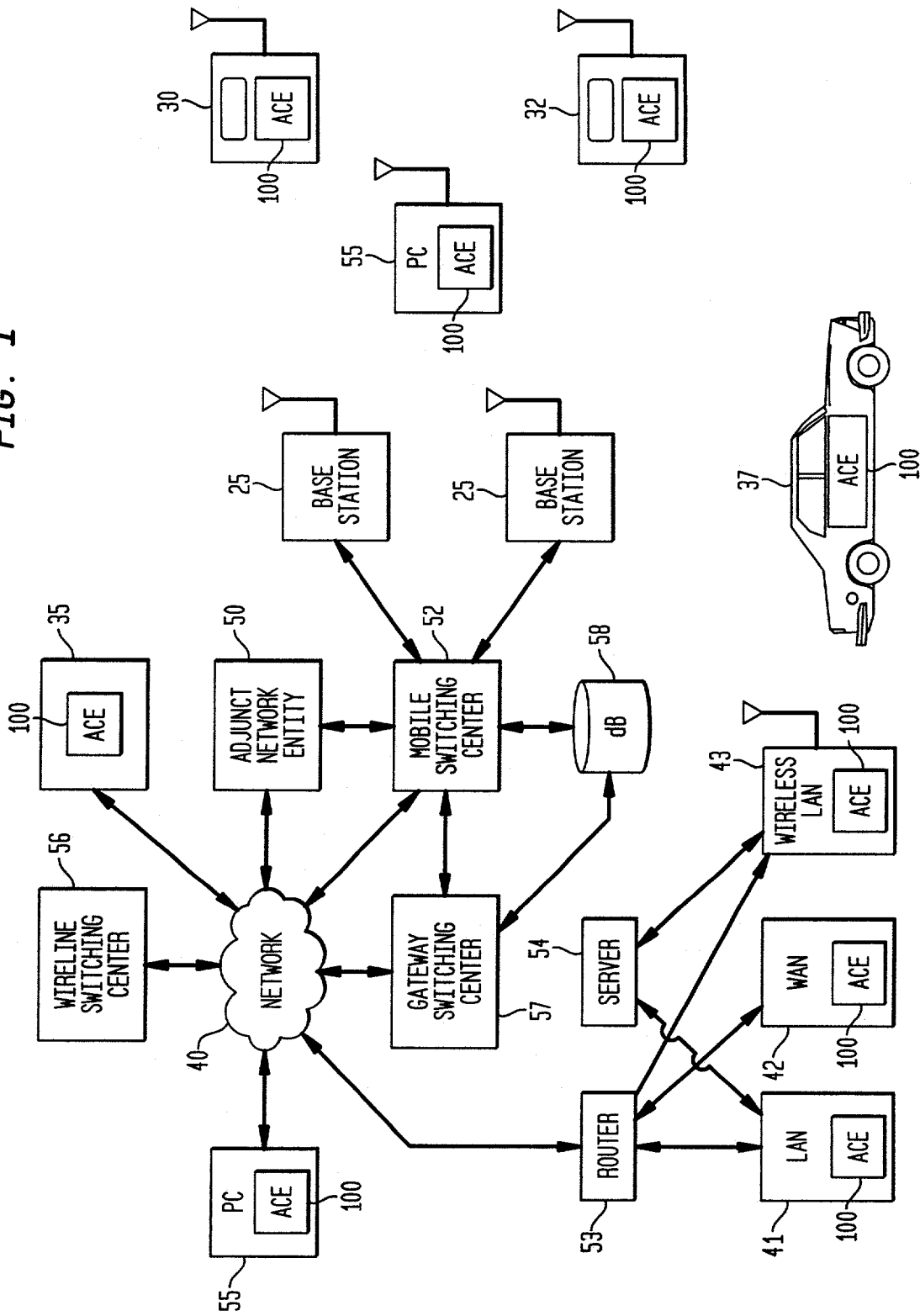
FIG. 1 is a block diagram illustrating multimedia communication systems with a plurality of apparatus embodiments in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments or generalized examples illustrated.

As indicated above, a need remains for an apparatus and method for adaptive multimedia reception and transmission in mobile communication systems, in which adaptive integrated circuitry is configured and reconfigured for multiple tasks. Such an apparatus and method are provided in accordance with the present invention, in which an ACE circuit (ACE IC) is utilized in a communication device, such as a cellular telephone, a GSM telephone, another type of mobile telephone or mobile station, or any other type of media communication device, including video, voice or radio, or other forms of multimedia. The adaptive integrated circuitry is configured and reconfigured for multiple tasks, such as channel acquisition, voice transmission, or multimedia and other data processing.

The apparatus and method of the present invention utilize a new form of integrated circuitry referred to as an ACE (adaptive computing engine). The ACE architecture utilizes a plurality of fixed and differing computational elements, such as (without limitation) correlators, multipliers, complex multipliers, adders, demodulators, interconnection elements, routing elements, combiners, finite state machine elements, reduced instruction set (RISC) processing elements, bit manipulation elements, input/output (I/O) and other interface elements, and the lower-level "building blocks" which form these units, which may be configured and reconfigured, in response to configuration information, to form the functional blocks (computational units and matrices) which may be needed, at any given or selected time, to perform higher-level functions and, ultimately, to execute or perform the selected operating mode, such as to perform wireless communication functionality, including channel acquisition, voice transmission, multimedia and other data processing. The methodology and systems of the present invention also minimize power consumption and are especially suitable for low power applications, such as for use in hand-held and other battery-powered devices.

FIG. 1 is a block diagram illustrating multimedia communication systems with a plurality of apparatus embodiments in accordance with the present invention. Referring to FIG. 1, as indicated above (and as discussed in greater detail below), the preferred apparatuses of the present invention consist of an ACE 100, coupled or combined with configuration information which provides the capability to configure and reconfigure for a plurality of functional or operational modes, such as channel acquisition and data or media processing, and may be implemented in a wide variety of embodiments including, for example, within wireless devices 30 and 32, wireline device 35, computer 55, consumer electronics, automobile electronics 37, and network infrastructure equipment, such as server 54, router 53, local area network (LAN) 41, wireless LAN 43, wide area network (WAN) 42, and while not separately illustrated as having an ACE 100, may also be included within an adjunct network entity 50, switching systems 52, 56 and 57, wireless base stations 25, and any other electronic device.

As indicated above, the terminology "configuration information" (or, equivalently, "adaptation information"), as used herein, should be understood generally to have and include its linguistic, plural connotation, i.e., configuration information is a plurality of information bits, groups or sets of information, namely, a "plurality" of configuration information. For example, "configuration information" may be viewed as being a set of configuration information comprised of a plurality of subsets, such subsets being first configuration information, second configuration information, third configuration information, and so on, through $n^{th}$ configuration information. Although a subset of configuration information may be singular (one bit of information contained in the subset), each such subset of configuration information is also generally plural, typically including more information than may be encoded by a single bit, such as 8, 16, 32 or 64 information bits. It should also be noted that as used herein, the terminology "adaptation" and "re-adaptation", is equivalent to and is utilized interchangeably with terminology such as "configuration" and "reconfiguration".

The configuration information may also exist in a variety of forms, and at any given time, may have a stored (or fixed)

nature, or may have a transient or temporal nature. For example, as illustrated in FIG. 1, configuration information may be stored as a binary (bit) file in a flash or other memory (for devices 32, 30 or 35) or in a computer or readable medium 20 (such as a CD-ROM, other optical drive, computer memory, hard drive or floppy disk) for computer 55. As discussed in greater detail below, such configuration information may also be interdigitated, intertwined or otherwise combined with data, forming what is referred to and defined herein as "silverware" or a "silverware" module, and stored as a binary (bit) file in a silverware storage media 15. The configuration information may also occur transiently and across time, for example, when wirelessly downloaded from a base station 25A to a wireless device 32 (such as a mobile station or other mobile telephone) over an air interface, or when wireline downloaded from a server 54 to a computer (PC) 55.

Referring to FIG. 1 in greater detail, a plurality of networks are illustrated, including local area network ("LAN") 41, wireless LAN 43, wide area network ("WAN") 42, and, more generally, network 40, such as a public switched telephone network ("PSTN") or an internet. Coupled to the various networks are router 53, servers 54, wireline switching center 56, mobile switching center ("MSC") 52, gateway switching center 57, database 58 (such as a home location register (HLR)), with further connection or couplability to wireless base stations (or other wireless transceivers) 25, wireline device 35, computer 55, and adjunct network entity 50. As known in the art, these various devices may be connected via trunking, optical and other signaling lines to each other and to broader networks (such as to a PSTN or internet), with multiple communication connections to other locations, such as providing a link to a satellite (not separately illustrated) and providing other wireless links (air interfaces). Also, while the wireline and mobile switching centers 56 and 52 are usually physically separated due to regulatory and other historical or legacy reasons, these switching centers may also be combined into one or more switching centers having both wireline and wireless functionalities.

These various server, switching, routing and other entities may also be connected through network 40 to one or more intelligent network devices referred to as an adjunct network entities, such as adjunct network entity 50, which may be an additional type of server, database, a service control point ("SCP"), a service circuit node ("SCN") (also referred to as a service node ("SN")), an intelligent peripheral ("IP"), a gateway, or another intelligent network device. One or more adjunct network entities 50 are preferably connected or coupled to a network 40, for direct or indirect connection to wireline switching center 56, MSC 52, LAN 41, WAN 42, wireless LAN 43, routers 53 and servers 54. In the preferred embodiment, an adjunct network entity 50 provides a node or platform for particular applications ("application nodes"), to perform various functions such as providing downloads of configuration information, authentication, security, authorization, and compatibility evaluation. In addition to inclusion within an adjunct network entity 50, these various application nodes may also be distributed among or included within the other various devices, such as within one or more servers 54. For example, one server 54 may be utilized to provide configuration information, with an adjunct network entity 50 utilized for authentication and security, with tracking and accounting occurring at yet another server 54 or computer 55.

Distributed embodiments are also within the scope of the present invention, as configuration information does not need to be local to any given ACE 100 device. For example, configuration information or silverware may be stored across a network 40, such as between and among application nodes 51, adjunct network entity 50, other server 54, and the other illustrated elements of FIG. 1. For such distributed systems, the ACE 100 may only be configured, such as through an operating system ("OS"), to obtain the configuration information, such as through one of these network devices.

The various devices, such as wireless devices 30 and 32, automotive electronics 37, and wireline device 35, may all include communication modalities. For example, wireless devices 30 and 32 may be GSM telephones for voice communication, or may be GSM multimedia devices, for voice, video, data, radio, or any other form of communication. In the preferred embodiment of the present invention, each one of these devices may be configured and reconfigured to be engaged in or executing multiple tasks, simultaneously and in varying proportions, such as channel acquisition, media reception, media transmission, data or media processing, synchronization, and control processing, depending upon the exigencies of any given communication session. For example, during channel acquisition, more ACE 100 resources may be dedicated to locating appropriate channels, such as frequencies and time slots. Subsequently, more ACE 100 resources may be dedicated to voice transmission and reception, along with multimedia reception, all on a plurality of acquired channels.

Figure 2:
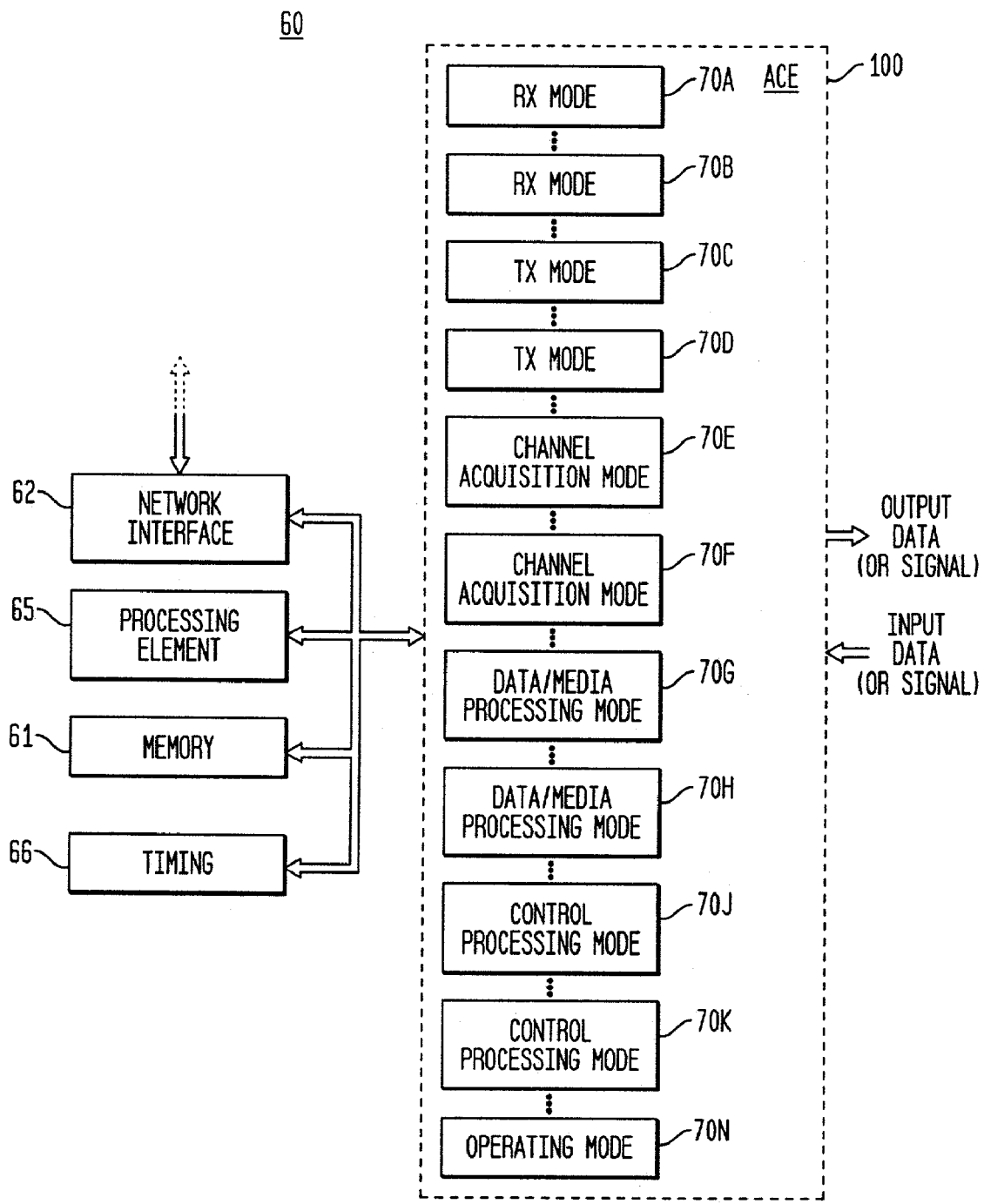
FIG. 2 is a block diagram illustrating a preferred apparatus embodiment in accordance with the present invention.

FIG. 2 is a block diagram illustrating a preferred apparatus embodiment 60 in accordance with the present invention. The apparatus 60 is preferably implemented as one or more integrated circuits, but also may be implemented as a single integrated circuit (system on a chip or "SOC"). The apparatus 60 includes an ACE 100, and may also include a memory 61, a network interface 62, a timing unit 66, and one or more other processing elements 65. Such an apparatus 60, for example, may be included within routers 53 and servers 54 of FIG. 1, or may be included within other embedded systems, such as within mobile stations or devices 30 and 32, wireline device 35, and so on. When the apparatus 60 is comprised solely of an ACE 100, as discussed in greater detail below, that ACE 100 will generally be configured to include processing, timing, network interface and other I/O functionality, with memory configured either through memory computational elements or directly within the matrix interconnection network (MIN). The apparatus 60, as illustrated in FIG. 2 with optional processing element 65, interface 62, timing unit 66, and memory 61, will typically be implemented to provide retro-compatibility with existing or other legacy systems and devices.

The network interface 62 is utilized for appropriate connection to a relevant channel, network or bus, for wireless or wireline communication, depending upon the selected wireless or wireline embodiment. It should also be noted, for purposes of clarification and not limitation, that the relevant "network" of the network interface 62 may also be either a wireline or wireless network. For example, the network interface 62 may provide impedance matching, drivers and other functions for a wireline interface for wireline embodiments, may provide demodulation and analog to digital conversion for a wireless interface for wireless embodiments (such as mobile communications), and also may provide a physical interface for the ACE 100 or memory 61 to communicate with other devices. In general, the network interface 62 is used to receive and transmit data, depending upon the selected embodiment, such as voice information, data and other multimedia, configuration information, silverware modules, control messages, authentication data and other pertinent information. The ACE 100 may also be configured to provide the functionality of the network interface 62, including internal IC I/O and external (off-chip) I/O, such as for PCI bus control.

The memory 61 may be an integrated circuit or portion of an integrated circuit, such as various forms of RAM, DRAM, SRAM, MRAM, FeRAM, ROM, EPROM, $E^2$PROM, flash, and so on. For current non-mobile or non-IC embodiments, the memory 61 may also be a magnetic (hard of floppy) drive, an optical storage device, or any other type of data storage apparatus and, as indicated above, may be distributed across multiple devices, which also may be adapted in the future for mobile or hand-held embodiments. In addition, depending upon the selected embodiment, and as discussed in greater detail below, the memory 61 may also be included within the ACE 100, through memory computational elements or within the matrix interconnection network (MIN). One or more processing elements 65, such as a microprocessor or digital signal processor (DSP), optionally may be included within apparatus 60, to provide any additional processing capability, such as reduced instruction set ("RISC") processing, or may be included as computational elements within the ACE 100.

Referring to FIG. 2, the operation of the apparatus 60 may be explained, particularly with reference to a GSM communication system. While the preferred embodiment is utilized for GSM communication systems, those of skill in the art will recognize the applicability of the invention to other forms of mobile or non-mobile communication systems utilizing channel allocations, code allocations, or trunked systems, such as CDMA, xDSL (digital subscriber line), or cable networks, with any and all of which system applications included within the scope of the invention.

For GSM systems, defined communication channels are available on multiple frequencies (or bands), using FDMA (frequency division multiple access), which in turn are divided into multiple time slots, using TDMA (time division multiple access), to create a plurality of channels, typically divided into traffic channels and control channels. Traffic channels are used to transmit an information payload, such as voice or data, or in accordance with the present invention, any type of media, and may utilize different data rates, such as full rate or half-rate. Configuration information may be transmitted on any type of channel, such as within one or more traffic channels or one or more control channels, depending upon the selected embodiment or the service provider.

Corresponding modes of the apparatus 60, for a corresponding traffic mode, include voice, data and media transmission and reception modes, allocated as needed; data or media processing modes (such as encoding, decoding, error correcting, and other data processing tasks); and some control processing, including processing of non-channel acquisition control channels, such as the slow associated control channel. It should be noted that during such a traffic mode, configuration information may also be transmitted by a network and received by the apparatus 60, for adaptation of the ACE 100 for any one or more of these and other tasks, as mentioned above.

Control channels are utilized within the various networks to provide control over matters such as network access, channel assignment, and synchronization. Broadcast channels (BCH) include a broadcast control channel (BCCH), used for mobile stations to obtain parameters to gain network access; a frequency-correction channel (FCCH), used to provide mobile stations with the system frequency reference; and a synchronization channel (SCH) to provide training sequences to mobile stations for timing synchronization. There are also common control channels (CCCH), such as random access channels, paging channels, and access grant channels. Dedicated control channels are also utilized for messaging between a base station and a mobile station, such as the slow and fast associated control channels.

Corresponding modes of the apparatus 60, for a corresponding acquisition mode, include channel acquisition and control processing, including without limitation processing control channels related to channel acquisition, such as the BCCH, FCCH, SCH and CCCH. Again, it should be noted that during such an acquisition mode, configuration information may also be transmitted by a network and received by the apparatus 60, for adaptation of the ACE 100 for any one or more of these and other tasks, as mentioned above.

In accordance with the present invention, the adaptability of the ACE 100 is utilized to maximize the potential of such a communication device, such as a wireless device (or mobile station) 30 or 32. Utilizing corresponding configuration information, the various matrices (illustrated as matrices 150 in FIG. 3) are configured and reconfigured for a plurality of operating modes 70, illustrated as operating modes 70A through 70N, such as a reception mode (70A and 70B), a transmission mode (70C and 70D), a channel acquisition mode (70E and 70F), a data or other media processing mode (70G and 70H), a control processing mode (70J and 70K), or any other necessary or desirable operating mode (operating mode 70N). Depending upon network conditions, such as channel availability and signal quality, the ACE 100 may configure and reconfigure for as many operating modes 70 as are within its IC capacity or other physical limitations, for optimization of any selected quality or attribute, such as to maximize data throughput or optimize voice quality.

Continuing to refer to FIG. 2 and continuing with the GSM example, network conditions may include a number of available channels, on a plurality of different frequencies and time slots, while the apparatus 60 (in a mobile station 30 or 32 or computer 55) is to engage in a voice conversation and a download of data. Accordingly, the apparatus 60, via the ACE 100, is initially configured such that the ACE 100 capacity is primarily involved in channel acquisition modes and control processing modes, to acquire and synchronize with a plurality of channels, possibly in different time slots and in different frequency bands. Once the channels are acquired, the ACE 100 is reconfigured for voice communication and data reception, namely, using some ACE 100 capability for voice reception and transmission, with other ACE 100 capability configured for data reception modes and data processing modes.

As indicated above, the apparatus 60 preferably includes a timing unit 66, which may be implemented as a separate component (e.g., as an ASIC or processing element) or may be implemented as an adaptive element of the ACE 100 having a different (higher) clock domain. Such a timing unit 66 preferably provides synchronization, precise timing, and over sampling, to provide information to and receive information from multiple, other ACE modes 70 which, generally, are each operating at one or more comparatively lower clocking frequencies, with each potentially synchronized to different TDMA time slots. This timing unit 66 may also provide a queuing interface to other ACE modes 70. In the preferred embodiment, the timing unit 66 is provided as a power saving element, as a high clocking frequency "hot spot" for precision timing and over sampling, with the rest of the apparatus 60 able to be clocked at a lower frequency.

This adaptation (configuration and reconfiguration) may occur as needed or desired, for any media communication applications. Continuing with the example, the apparatus 60 may be in a mobile environment during this voice and data transmission, with the communication sessions to be handed-off or transferred to another base station 25. During this transition, the ACE 100 of the apparatus 60 may be reconfigured for channel acquisition and control processing modes, with a corresponding decrease in data transmission rates, as the same capacity of the ACE 100 is no longer available for data reception and processing. Following the hand-off, the ACE 100 may be reconfigured for more capacity, once again, directed to data reception modes and data processing modes.

The operation of the various embodiments illustrated in FIGS. 1 and 2 is also discussed below, following explanation of the ACE 100 architecture with reference to FIGS. 3-9, and also with reference to FIG. 10.

Figure 3:
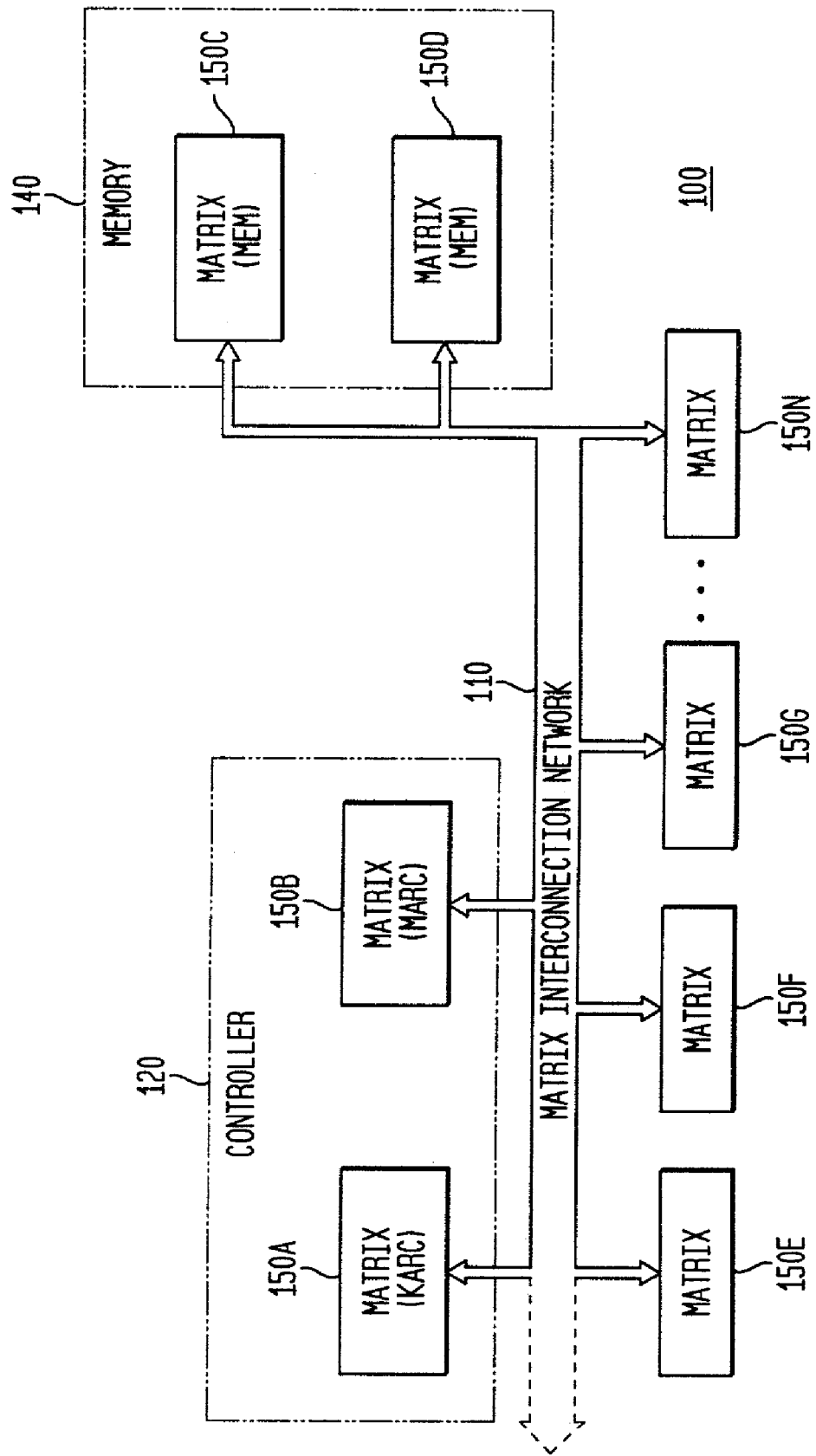
FIG. 3 is a block diagram illustrating a preferred adaptive computing engine (ACE) embodiment in accordance with the present invention.
Figure 4:
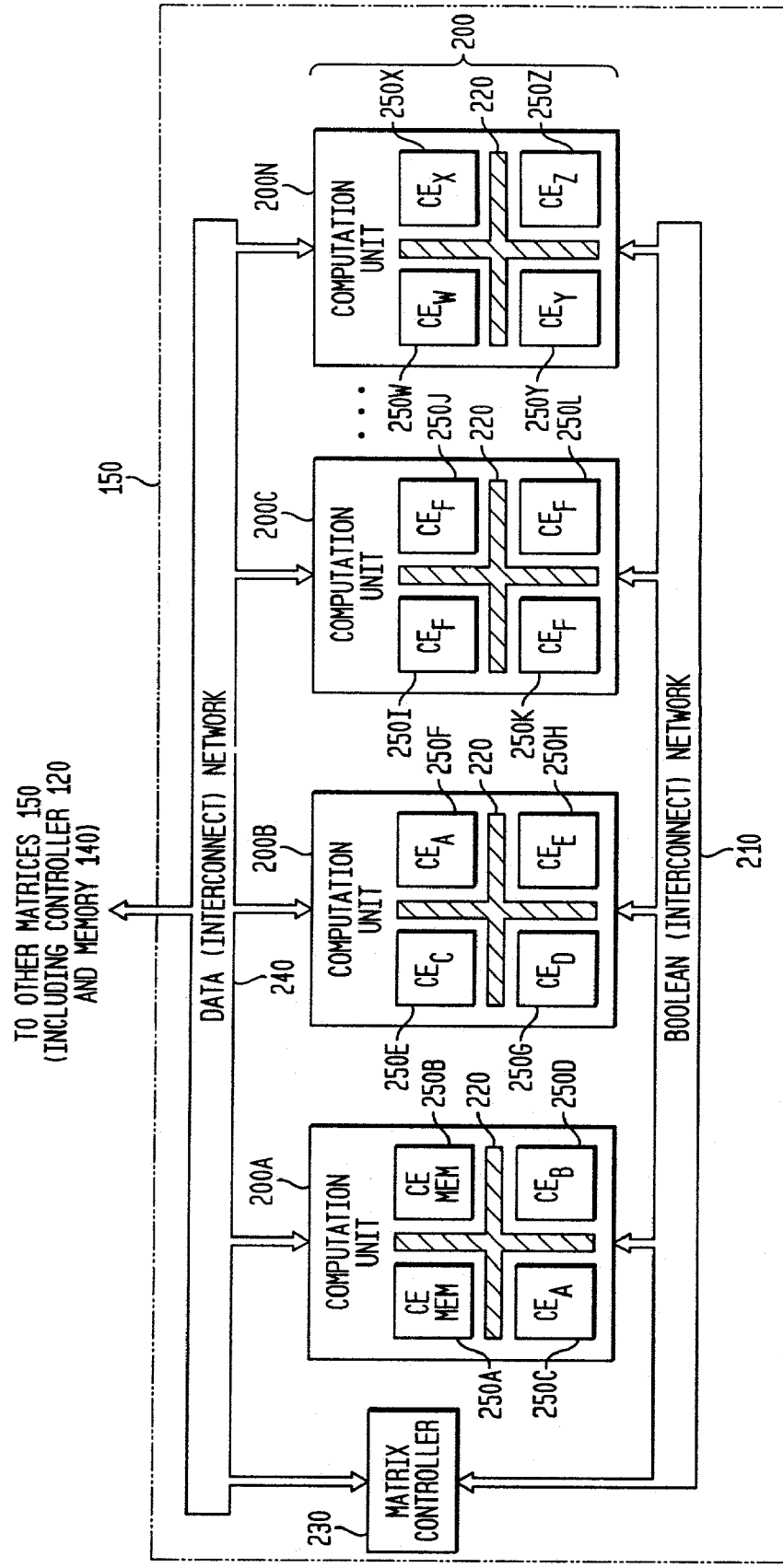
FIG. 4 is a block diagram illustrating a reconfigurable matrix, a plurality of computation units, and a plurality of computational elements, in accordance with the present invention.

FIG. 3 is a block diagram illustrating a preferred ACE apparatus 100 embodiment in accordance with the present invention. The ACE 100 is preferably embodied as an integrated circuit, or as a portion of an integrated circuit having other, additional components. (The ACE 100 is also described in detail in the first related application.) In the preferred embodiment, and as discussed in greater detail below, the ACE 100 includes one or more reconfigurable matrices (or nodes) 150, such as matrices 150A through 150N as illustrated, and a matrix interconnection network (MIN) 110. Also in the preferred embodiment, and as discussed in detail below, one or more of the matrices 150, such as matrices 150A and 150B, are configured for functionality as a controller 120, while other matrices, such as matrices 150C and 150D, are configured for functionality as a memory 140. While illustrated as separate matrices 150A through 150D, it should be noted that these control and memory functionalities may be, and preferably are, distributed across a plurality of matrices 150 having additional functions to, for example, avoid any processing or memory "bottlenecks" or other limitations. Such distributed functionality, for example, is illustrated in FIG. 4. The various matrices 150 and matrix interconnection network 110 may also be implemented together as fractal subunits, which may be scaled from a few nodes to thousands of nodes. While not separately illustrated in FIG. 3, it should be noted that one or more matrices 150 are also configured for a communication functionality directed to the present invention, for functions such as synchronization, queuing, over sampling, and under sampling.

A significant departure from the prior art, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, to provide any given connection between and among the reconfigurable matrices 150, including those matrices 150 configured as the controller 120 and the memory 140, as discussed in greater detail below.

It should also be noted that once configured, the MIN 110 also and effectively functions as a memory, directly providing the interconnections for particular functions, until and unless it is reconfigured. In addition, such configuration and reconfiguration may occur in advance of the use of a particular function or operation, and/or may occur in real-time or at a slower rate, namely, in advance of, during or concurrently with the use of the particular function or operation. Such configuration and reconfiguration, moreover, may be occurring in a distributed fashion without disruption of function or operation, with computational elements in one location being configured while other computational elements (having been previously configured) are concurrently performing their designated function. This configuration flexibility of the ACE 100 contrasts starkly with FPGA reconfiguration, both which generally occurs comparatively slowly, not in real-time or concurrently with use, and which must be completed in its entirety prior to any operation or other use.

The matrices 150 configured to function as memory 140 may be implemented in any desired or preferred way, utilizing computational elements (discussed below) of fixed memory elements, and may be included within the ACE 100 or incorporated within another IC or portion of an IC (such as memory 61). In the preferred embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, FeRAM, ROM, EPROM or E$^2$PROM. As mentioned, this memory functionality may also be distributed across multiple matrices 150, and may be temporally embedded, at any given time, as a particular MIN 110 configuration. In addition, in the preferred embodiment, the memory 140 preferably includes direct memory access (DMA) engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor, such as a processing element 65 of FIG. 2.) This control functionality may also be distributed throughout one or more matrices 150 which perform other, additional functions as well. In addition, this control functionality may be included within and directly embodied as configuration information, without separate hardware controller functionality. The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the preferred form of combined data, configuration (and other control) information referred to herein interchangeably as "silverware" ("Agware") or as a "silverware" module.

Figure 5:
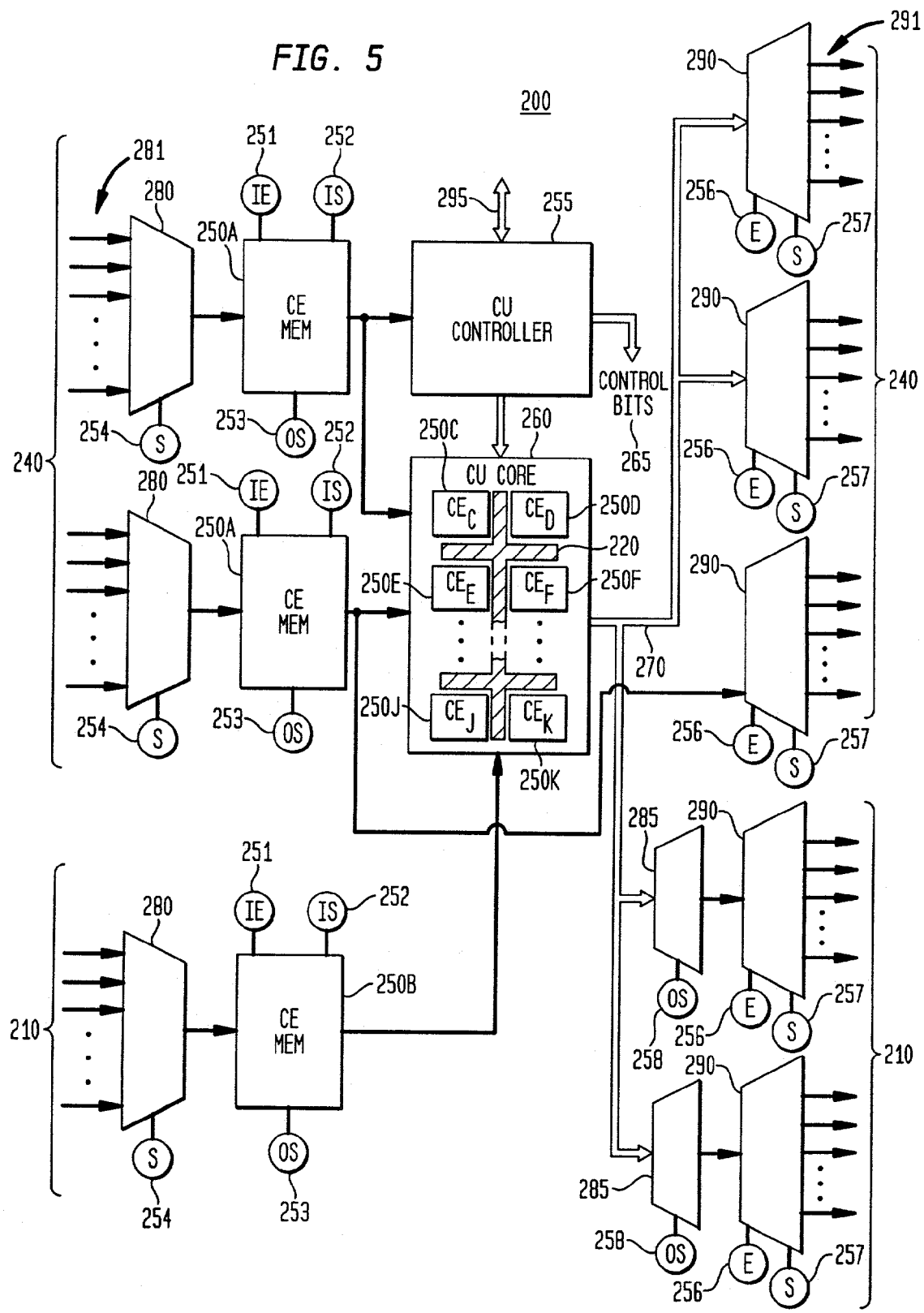
FIG. 5 is a block diagram illustrating, in greater detail, a computational unit of a reconfigurable matrix in accordance with the present invention.

The matrix interconnection network 110 of FIG. 3, and its subset interconnection networks separately illustrated in FIGS. 4 and 5 (Boolean interconnection network 210, data interconnection network 240, and interconnect 220), collectively and generally referred to herein as "interconnect", "interconnection(s)", "interconnection network(s)" or MIN, may be implemented generally as known in the art, such as utilizing field programmable gate array ("FPGA") interconnection networks or switching fabrics, albeit in a considerably more varied fashion. (As used herein, "field programmability" refers to the capability for post-fabrication adding or changing of actual IC functionality, as opposed to programming of existing IC structure or function (such as in a microprocessor or DSP). In the preferred embodiment, the various interconnection networks are implemented as described, for example, in U.S. Pat. Nos. 5,218,240, 5,336,950, 5,245,227, and U.S. Pat. No. 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable, routable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 15ON; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 4 and 5, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real-time operation of the ACE 100 and its inherent advantages.

The first novel concepts of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 4) of the matrices 150, such as pluralities of multipliers, complex multipliers, and adders, each of which are designed for optimal execution of corresponding multiplication, complex multiplication, and addition functions. Through the varying levels of interconnect, corresponding algorithms are then implemented, at any given time, through the configuration and reconfiguration of fixed computational elements (250), namely, implemented within hardware which has been optimized and configured for efficiency, i.e., a "machine" is configured in real-time which is optimized to perform the particular algorithm.

The next and perhaps most significant concept of the present invention, and a marked departure from the concepts and precepts of the prior art, is the concept of reconfigurable "heterogeneity" utilized to implement the various selected algorithms mentioned above. As indicated in the related application, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in advance, in real-time or at a slower rate, to perform the selected algorithm, such as the performance of discrete cosine transformations often utilized in mobile communications. As a consequence, in accordance with the present invention, different ("heterogeneous") computational elements (250) are configured and reconfigured, at any given time, through various levels of interconnect, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm, such as to implement channel acquisition and control processing in a GSM operating mode in a mobile station 30 or 32. At another instant in time, the configuration may be changed, to interconnect other computational elements (250) or connect the same computational elements 250 differently, for the performance of another function or algorithm, such as for data and voice reception for a GSM operating mode. Two important features arise from this temporal reconfigurability. First, as algorithms may change over time to, for example, implement a new technology standard, the ACE 100 may co-evolve and be reconfigured to implement the new algorithm. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors. This temporal reconfigurability also illustrates the memory functionality inherent in the MIN 110, as mentioned above.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as "silverware" or as a "silverware" module, is the subject of another, second related patent application. For purposes of the present invention, however, it is sufficient to note that this coupling of data and configuration information into one information (or bit) stream, which may be continuous or divided into packets, helps to enable real-time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements has occurred (i.e., is in place), as directed by (a first subset of) the configuration information, the data for use in the algorithm is immediately available as part of the silverware module. The same computational elements may then be reconfigured for a second period of time, as directed by second configuration information (i.e., a second subset of configuration information), for execution of a second, different algorithm, also utilizing immediately available data. The immediacy of the data, for use in the configured computational elements, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or digital signal processor ("DSP").

This use of silverware modules, as a commingling of data and configuration information, in conjunction with the reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device. For example, in accordance with the present invention, while configured for a first operating mode, using a first set of configuration information, as a CDMA mobile telephone for use in the United States, the ACE 100 may be reconfigured using a second set of configuration information for an operating mode as a GSM mobile telephone for use in Europe.

Referring again to FIG. 3, the functions of the controller 120 (preferably matrix (KARC) 150A and matrix (MARC) 150B, configured as finite state machines) may be explained with reference to a silverware module, namely, the tight coupling of data and configuration information within a single stream of information, with reference to multiple potential modes of operation, with reference to the reconfigurable matrices 150, and with reference to the reconfigurable computation units 200 and the computational elements 250 illustrated in FIG. 4. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the preferred embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the preferred embodiment, the system requirements for such configuration or reconfiguration are included within the silverware module or configuration information, for use by the matrix (KARC) 150A in performing this evaluative function. If the configuration or reconfiguration may occur without such adverse affects, the silverware module is allowed to load into the matrices 150 (of memory 140), with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100.

Continuing to refer to FIG. 3, the matrix (MARC) 150B manages the scheduling of matrix 150 resources, clocking, and the timing of any corresponding data, to synchronize any configuration or reconfiguration of the various computational elements 250 and computation units 200 with any corresponding input data and output data. In the preferred embodiment, timing or other clocking information is also included within a silverware module or, more generally, within configuration information, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real-time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

FIG. 4 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250. As illustrated in FIG. 4, any matrix 150 generally includes a matrix controller 230, a plurality of computation (or computational) units 200, and as logical or conceptual subsets or portions of the matrix interconnect network 110, a data interconnect network 240 and a Boolean interconnect network 210. As mentioned above, in the preferred embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, configuration, or connection functionality.

Continuing to refer to FIG. 4, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, utilizing the interconnect 220, the Boolean network 210, and the matrix interconnection network 110. While illustrated with effectively two levels of interconnect (for configuring computational elements 250 into computational units 200, and in turn, into matrices 150), for ease of explanation, it should be understood that the interconnect, and corresponding configuration, may extend to many additional levels within the ACE 100. For example, utilizing a tree concept, with the fixed computational elements analogous to leaves, a plurality of levels of interconnection and adaptation are available, analogous to twigs, branches, boughs, limbs, trunks, and so on, without limitation.

In the preferred embodiment, the various computational elements 250 are designed and grouped together, into the various adaptive and reconfigurable computation units 200 (as illustrated, for example, in FIGS. 5 through 9). In addition to computational elements 250 which are designed to execute a particular algorithm or function, such as multiplication, correlation, clocking, synchronization, queuing, sampling, or addition, other types of computational elements 250 are also utilized in the preferred embodiment. As illustrated in FIG. 4, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 150B), especially suitable for complicated control processing.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, clocking, synchronization, and so on (as illustrated below, for example, with reference to FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 4 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 4. Lastly, a fifth type of computation unit 200 may be included to perform bit-level manipulation, such as for encryption, decryption, channel coding, Viterbi decoding, and packet and protocol processing (such as Internet Protocol processing). In addition, another (sixth) type of computation unit 200 may be utilized to extend or continue any of these concepts, such as bit-level manipulation or finite state machine manipulations, to increasingly lower levels within the ACE 100 architecture.

In the preferred embodiment, in addition to control from other matrices or nodes 150, a matrix controller 230 may also be included or distributed within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

FIG. 5 is a block diagram illustrating, in greater detail, an exemplary or representative computation unit 200 of a reconfigurable matrix 150 in accordance with the present invention. As illustrated in FIG. 5, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the preferred embodiment, the selection of various input and output lines 281 and 291, and the creation of various connections through the interconnect (210, 220 and 240), is under control of control bits 265 from the computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes a computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 295 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of data flow graphs (DFGs), generating decision nodes in such DFGs, and may also be used for data routing within such DFGs.

Figures 6, 6A:
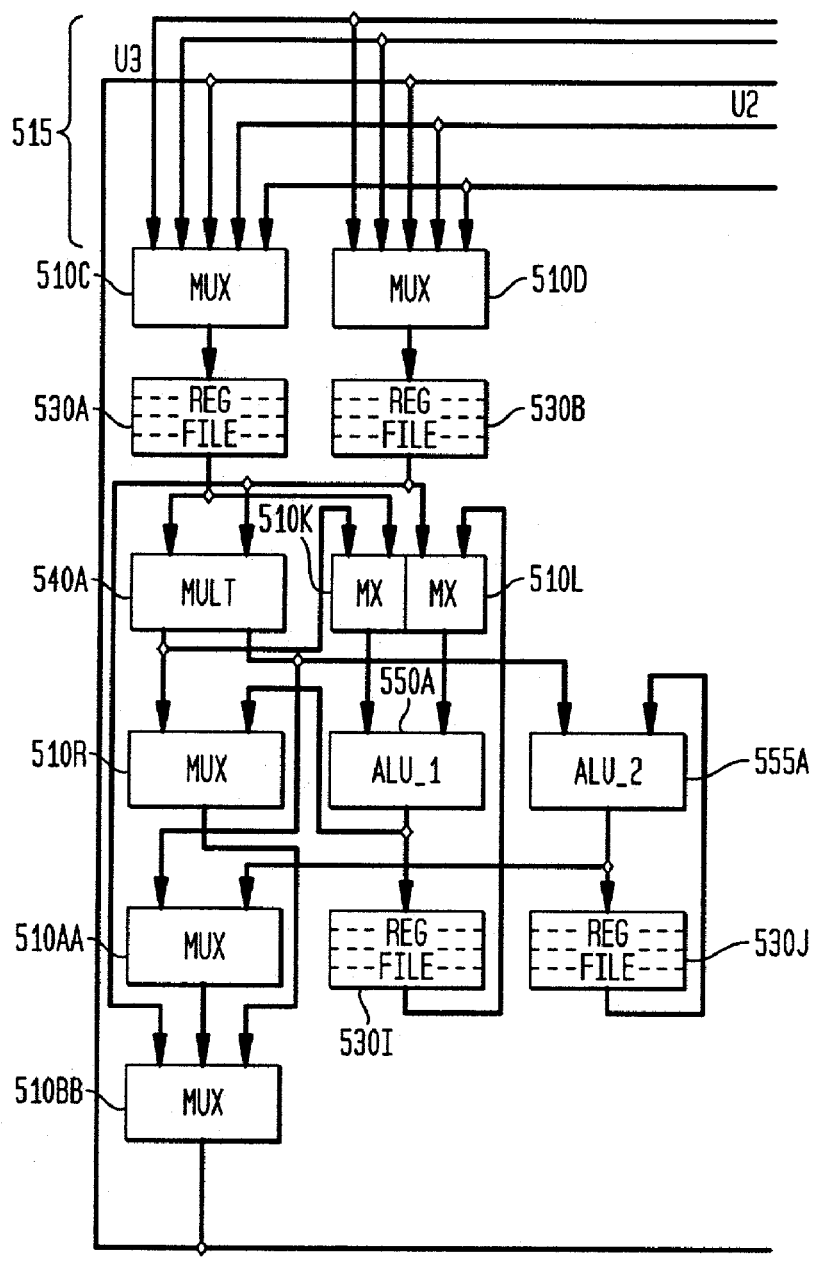
FIG. 6 is a block diagram illustrating, in detail, a preferred multi-function adaptive computational unit having a plurality of different, fixed computational elements, in accordance with the present invention.
Figure 6B:
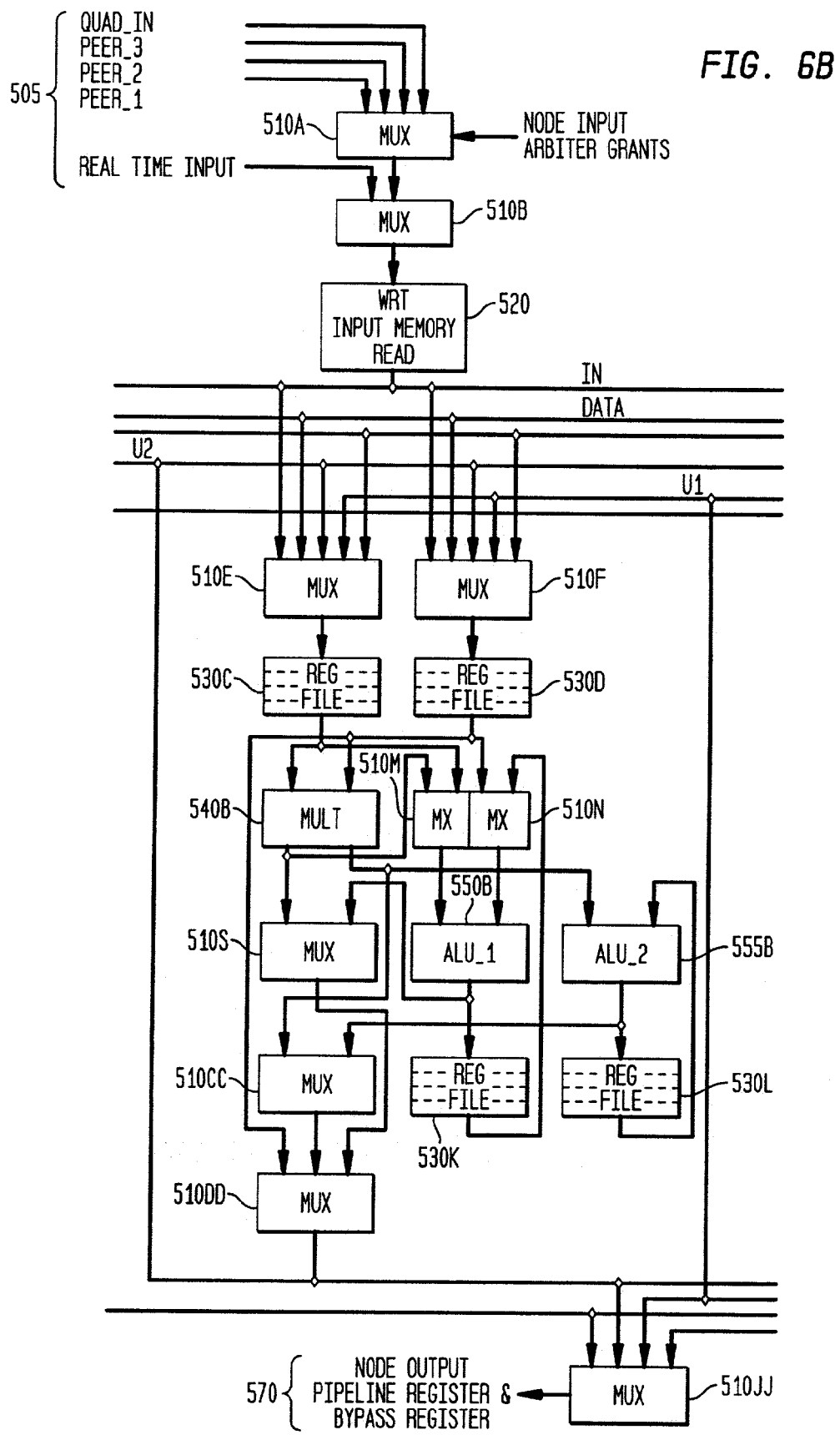
Figure 6C:
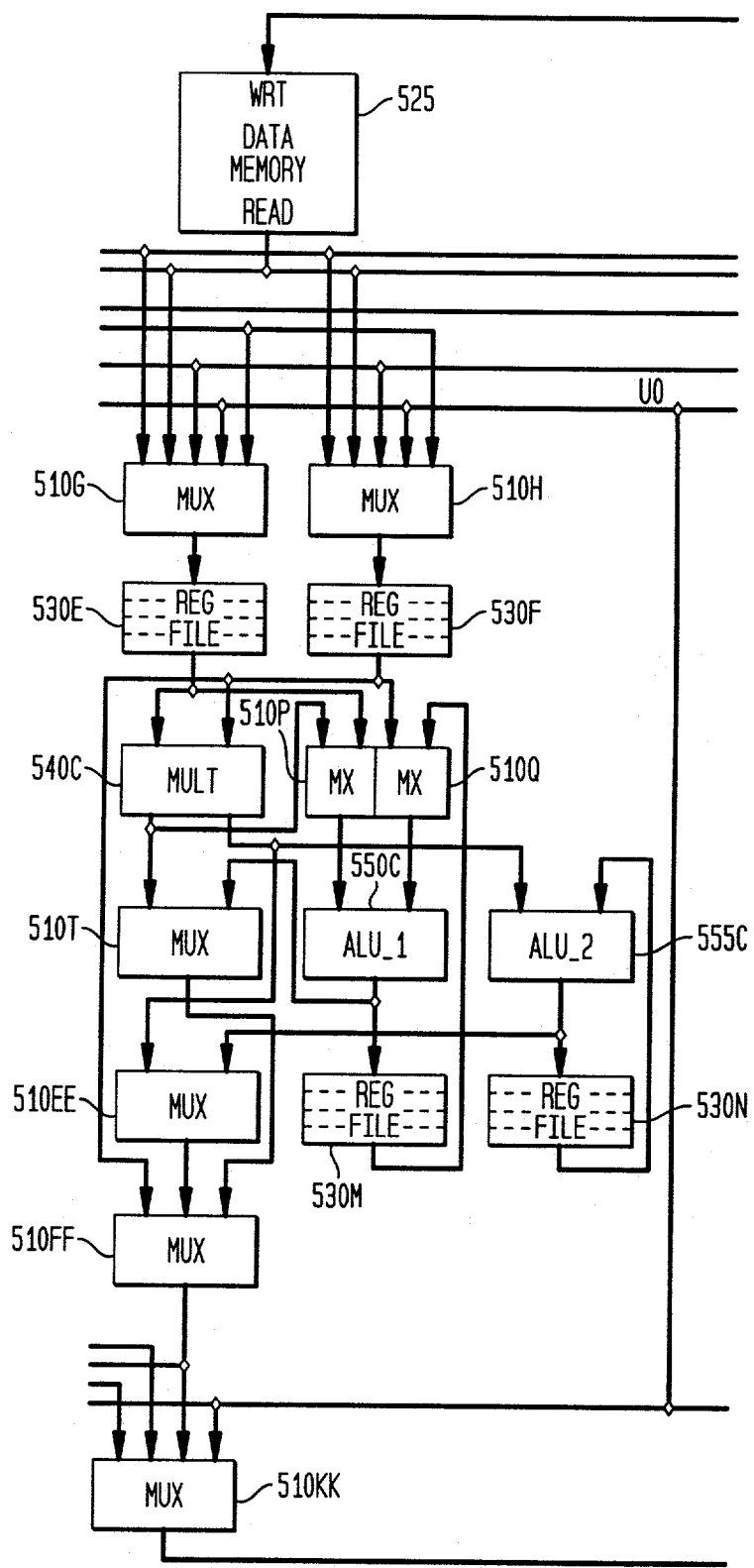
Figure 6D:
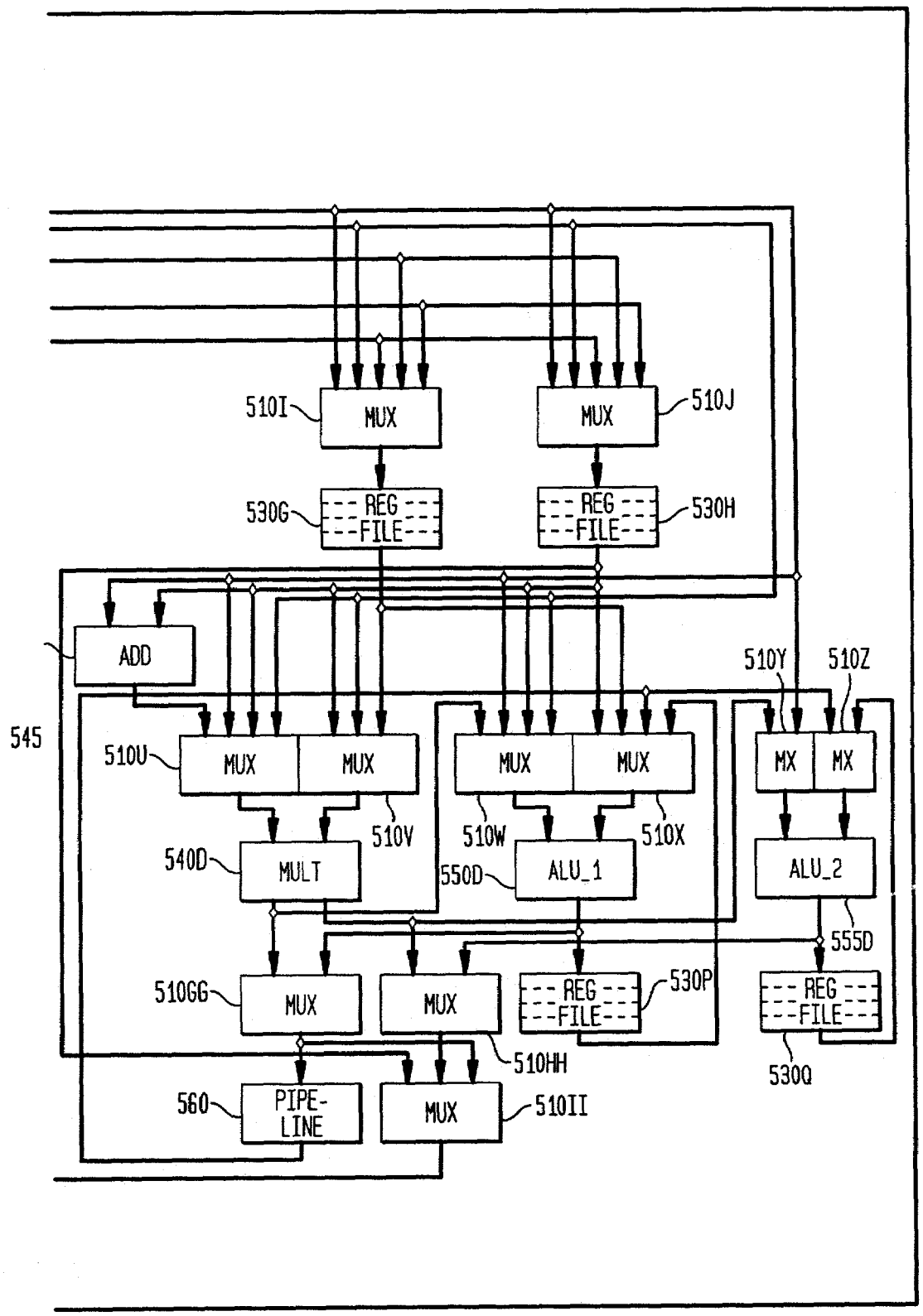

FIG. 6 is a block diagram illustrating, in detail, an exemplary, preferred multi-function adaptive computational unit 500 having a plurality of different, fixed computational elements, in accordance with the present invention. When configured accordingly, the adaptive computation unit 500 performs a wide variety of functions discussed in the related application, such as finite impulse response filtering, fast Fourier transformation, and other functions such as discrete cosine transformation, useful for communication operating modes. As illustrated, this multi-function adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation. Not separately illustrated in FIG. 6, there may be additional levels of interconnect and other, additional connections between and among the various computational elements.

FIG. 7 is a block diagram illustrating, in detail, a preferred adaptive logic processor (ALP) computational unit 600 having a plurality of fixed computational elements, in accordance with the present invention. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
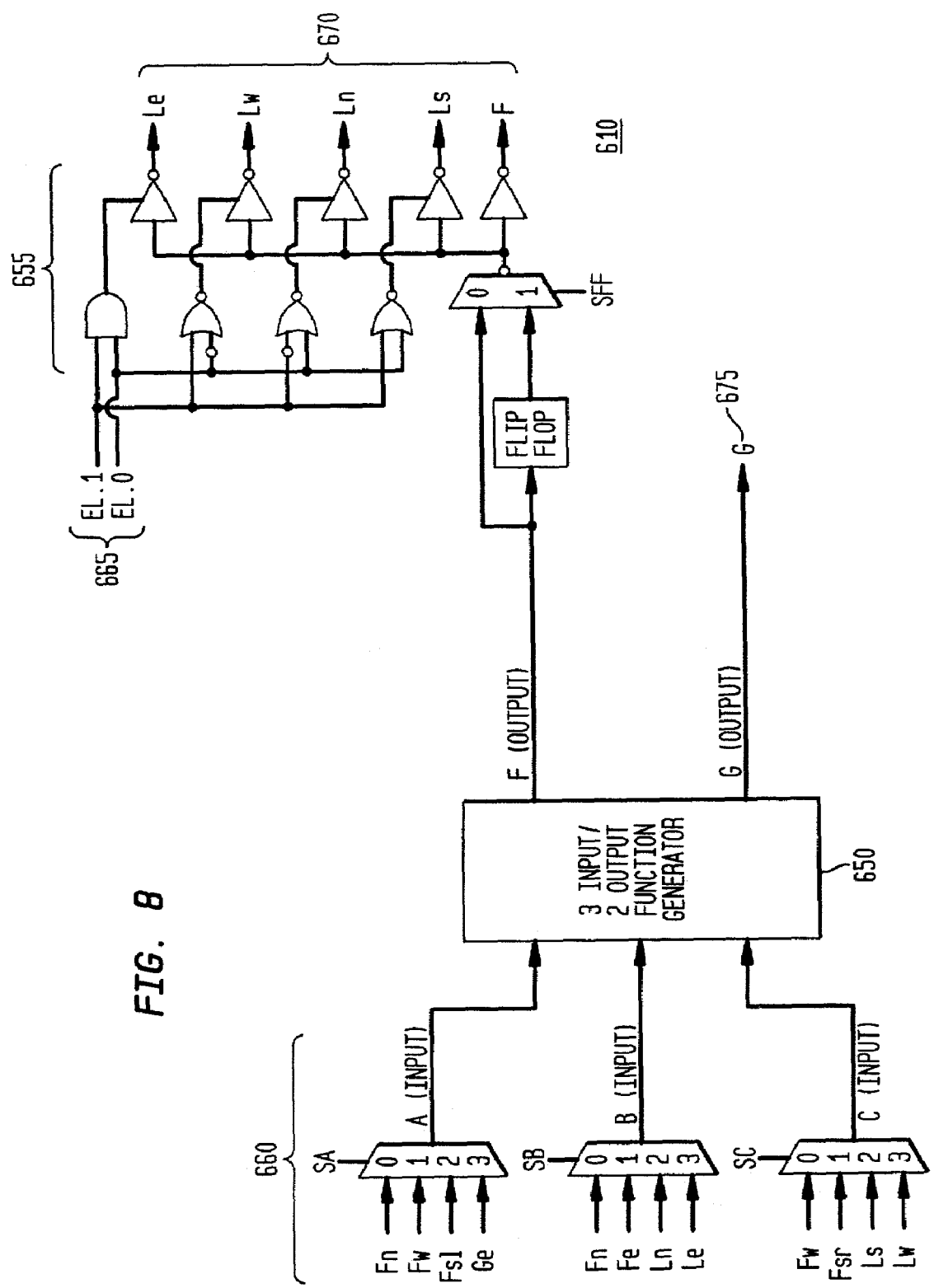
FIG. 8 is a block diagram illustrating, in greater detail, a preferred core cell of an adaptive logic processor computational unit with a fixed computational element, in accordance with the present invention.

FIG. 8 is a block diagram illustrating, in greater detail, a preferred core cell 610 of an adaptive logic processor computational unit 600 with a fixed computational element 650, in accordance with the present invention. The fixed computational element is a 3-input-2-output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
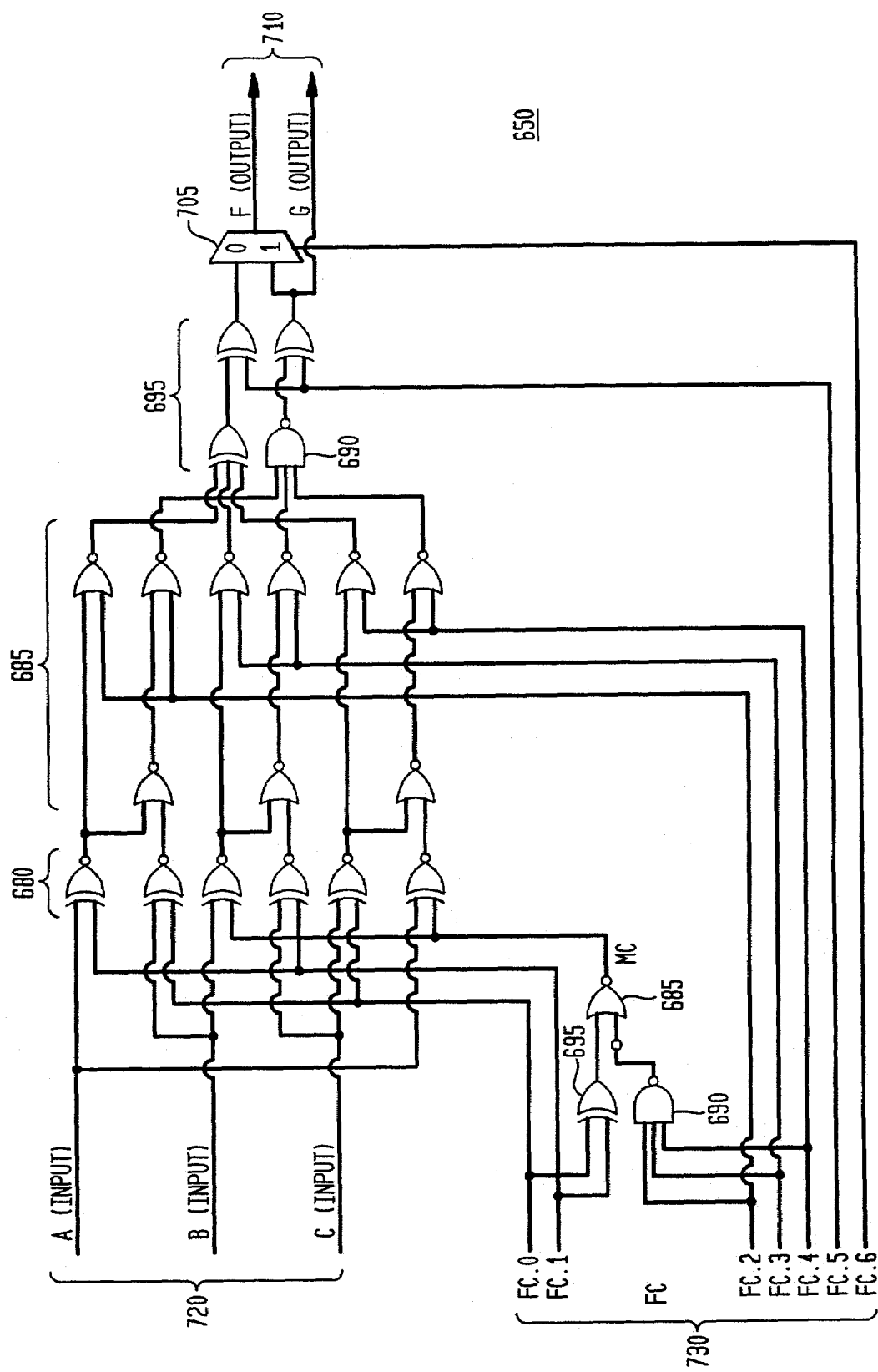
FIG. 9 is a block diagram illustrating, in greater detail, a preferred fixed computational element of a core cell of an adaptive logic processor computational unit, in accordance with the present invention.

FIG. 9 is a block diagram illustrating, in greater detail, a preferred fixed computational element 650 of a core cell 610 of an adaptive logic processor computational unit 600, in accordance with the present invention. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

As may be apparent from the discussion above, this use of a plurality of fixed, heterogeneous computational elements (250), which may be configured and reconfigured to form heterogeneous computation units (200), which further may be configured and reconfigured to form heterogeneous matrices 150, through the varying levels of interconnect (110, 210, 240 and 220), and so on, creates an entirely new class or category of integrated circuit, which may be referred to interchangeably as an adaptive computing architecture or adaptive computing engine. It should be noted that the adaptive computing architecture of the present invention cannot be adequately characterized, from a conceptual or from a nomenclature point of view, within the rubric or categories of FPGAs, ASICs or processors. For example, the non-FPGA character of the adaptive computing architecture is immediately apparent because the adaptive computing architecture does not comprise either an array of identical logical units, or more simply, a repeating array of any kind. Also for example, the non-ASIC character of the adaptive computing architecture is immediately apparent because the adaptive computing architecture is not application specific, but provides multiple modes of functionality and is reconfigurable, preferably in real-time. Continuing with the example, the non-processor character of the adaptive computing architecture is immediately apparent because the adaptive computing architecture becomes configured, to directly operate upon data, rather than focusing upon executing instructions with data manipulation occurring as a byproduct.

Referring again to FIGS. 1 and 2, the various apparatuses and methodology of the present invention may now be viewed in context of the ACE 100 architecture, based upon configuration and/or reconfiguration of fixed computational elements 250 in response to one or more sets of configuration information. Namely, the ACE 100 may be configured and reconfigured for the seamless, and potentially simultaneous, performance of a wide variety of tasks, while utilizing the same ACE hardware, namely, the matrices 150, computational units 200, and fixed and differing computational elements 250. For the communication applications of the present invention, the matrices 150, computational units 200, and fixed and differing computational elements 250 of the ACE 100 are configured and reconfigured for a plurality of communication operating modes, including voice and media (data) reception and transmission, channel acquisition, data and media processing, control processing, and any other necessary or desirable functions, such as information display, preferably utilizing configurations for a plurality of lower level functional or operating modes, such as synchronization, queuing, over sampling, and under sampling. In the preferred embodiment, the configuration and reconfiguration occurs to adaptively optimize the performance of the particular activity over time, such as to increase the speed of channel acquisition, increase throughput rates, increase perceived voice and media quality, and decrease the rate of dropped communication sessions.

Such configuration and reconfiguration may occur in a wide variety of ways. For example, an entire ACE 100 may be configured in advance of any particular use, such as pre-configured as a mobile communication device. In other embodiments, an ACE 100 may be configured to have an operating system, to power on (boot), and obtain and load other configurations for particular operating modes and functions, such as through a network 40. An ACE 100 may also be partially configured, with some matrices 150 configured and operating, while other matrices 150 are being configured for other functions.

As mentioned above, such configuration information may be interleaved with data to form silverware (or a silverware module). In addition, such configuration information may also be separate from any data (effectively distributing a silverware module across time). For example, a first set of configuration information may be provided to an ACE 100 for a first operating mode, such as for mobile communications. Data may be subsequently provided separately, such as voice data, during any given communication session. The various controller 120 functions of the ACE 100 then interleave the appropriate subsets of configuration information with corresponding data to provide silverware modules to the matrices 150. As mentioned above, such controller functions may be distributed within the various matrices 150, or may be embedded within the configuration information itself.

Another novel element of the present invention concerns a configuration or reconfiguration request generated by an ACE 100 itself (or another device including an ACE 100) providing, among other things, mechanisms for self-modification and self-configuration. For example, an ACE 100 (in a mobile station 30 or 32) typically having a first, CDMA configuration for use in the United States may be powered on in Europe; in the absence of standard CDMA signaling, the ACE 100 may request a wireless download of a second set of configuration information applicable to its current location, enabling the ACE 100 to have a GSM configuration for use in Europe.

As indicated above, configuration information is generally plural, consisting of a plurality of subsets of configuration information, such as first configuration information, second configuration information, through $n^{th}$ configuration information. One "set" of configuration information may be considered to correspond to a particular operating mode of the ACE 100. For example, a first set of configuration information may provide a CDMA operating mode, while a second set of configuration information may provide a GSM operating mode.

Also as indicated above, for a given or selected higher-order operating mode of an ACE 100 (or, equivalently, for a given or selected set of configuration information), the various fixed, heterogeneous computational elements 250 are correspondingly configured and reconfigured for various lower-level or lower-order functional modes in response to the subsets of the configuration information, such as configuration for discrete cosine transformation in response to first configuration information and reconfiguration for fast Fourier transformation in response to second configuration information.

The configuration information may also have different forms. In one embodiment, configuration information may include one or more discrete packets of binary information, which may be stored in memory 140, distributively stored within the matrices 150, or directly stored as a configuration of MIN 110. Configuration information may also be embodied in a continuous form, such as a continuous stream of binary or other information. As directed, configuration and other control bits from the configuration information are interdigitated with data to form silverware modules, for use in real-time within an ACE 100. In another embodiment, configuration information may be provided in real-time with corresponding data, in the form of a continuous stream (continuous for the duration of the selected function). For example, configuration information for a MP3 player may be provided in real-time in a silverware stream with the data bit file for the music to be played.

Figure 10:
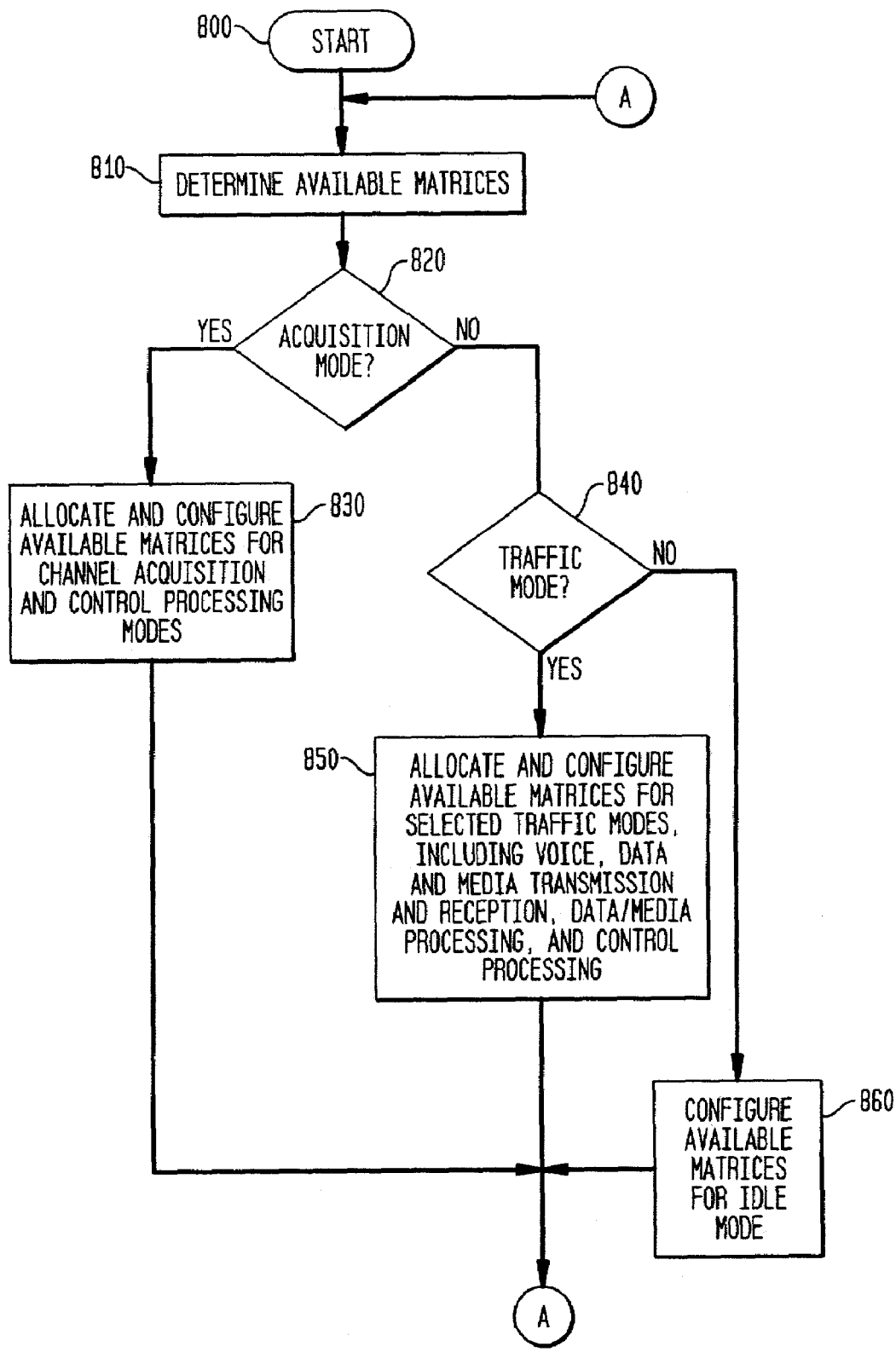
FIG. 10 is a flow diagram illustrating a method embodiment in accordance with the present invention.

FIG. 10 is a high-level flow diagram illustrating a method embodiment in accordance with the present invention, and provides a useful summary. The method begins, start step 800, with a determination of the available matrices 150 within the ACE 100, step 810, such as a determination of the available capacity within the ACE 100, given its other, then current tasks. Next, the method determines whether the apparatus 60 is in acquisition mode, step 820. When the apparatus 60 is in acquisition mode, the method proceeds to step 830, and allocates, configures and adapts the matrices 150 of apparatus 60 for channel acquisition and control processing modes. As discussed above, for the preferred embodiment in acquisition mode, when not engaged in other activities, virtually all or a significant proportion of the matrices 150 of the ACE 100 are configured for acquisition mode, to minimize channel (or system) acquisition time and/or increase acquisition reliability. Of course, this allocation will vary, particularly when additional channels are to be acquired while the apparatus 60 is engaged in other activities, such as in a current traffic mode. In addition, as mentioned above, a matrix 150 of the ACE 100 is preferably configured as a timing unit, providing synchronization, over sampling, and queuing functionality.

When the apparatus 60 is not in acquisition mode in step 820, such as having acquired the needed or desired channels, the method proceeds to step 840 and determines whether it is in traffic mode. When the apparatus 60 is in traffic mode, the method proceeds to step 850, and dynamically allocates, configures and adapts the selected matrices 150 of apparatus 60 for the traffic mode, namely, allocating and configuring resources for both voice or media reception, voice or media transmission, data or media processing, and control processing. As mentioned above, depending upon environmental and other conditions, relatively more or fewer resources may be allocated between these various functions.

In general, the number of matrices 150 configured for voice, data or other media reception and transmission, data or media processing, and control processing modes are dynamically determined based upon one or more of a plurality of channel-dependent parameters, including without limitation a relative power level, a number of identified multipaths, a number of identified base stations, received traffic signal-to-noise ratio, and received traffic error rate. For example, for an impending hand-off, comparatively more resources may be configured for channel acquisition and control processing, and following such a hand-off, comparatively more resources may be configured for voice, data or other media reception and transmission, data or media processing, and control processing modes. Those of skill in the art will recognize that numerous algorithms and other allocation methods are known and available to provide such system allocation under various fading, multipath and other environmental conditions. It should also be noted that, for each of the various transitions between acquisition and traffic modes, with corresponding matrix 150 allocations for various types of data and control processing, configuration information may also be transmitted to the apparatus 60, either alone or in conjunction with data (as silverware).

Continuing to refer to FIG. 10, when the apparatus 60 is not in acquisition mode in step 820, and is not in traffic mode in step 840, the method proceeds to step 860, and dynamically configures and adapts the apparatus 60 for the idle mode, configuring and allocating resources primarily for intermittent control messages and intermittent checking for received pages (path reception). In addition, resources may be allocated for a power saving mode, with some of the matrices 150 configured for a sleep, low power, or powered-off mode. Following steps 830, 850 or 860, the method returns to step 8100, for repeated iterations of the method for adaptive multimedia transmission and reception, in accordance with the present invention.

In summary, the present invention provides an apparatus 60 for adaptive multimedia transmission and reception, comprising a network interface 62, a plurality of heterogeneous computational elements 250, and an interconnection network (110, 210, 220, 240) coupled to the network interface and to the plurality of heterogeneous computational elements. The plurality of heterogeneous computational elements include a first computational element and a second computational element, the first computational element having a first fixed architecture and the second computational element having a second fixed architecture, with the first fixed architecture being different than the second fixed architecture. The interconnection network is operative to configure the plurality of heterogeneous computational elements for a first media functional mode of a plurality of media functional modes, in response to first configuration information, and the interconnection network is further operative to reconfigure the plurality of heterogeneous computational elements for a second media functional mode of the plurality of media functional modes, in response to second configuration information, with the first media functional mode being different than the second media functional mode.

The first and second fixed architectures are selected from a plurality of specific architectures, with the plurality of specific architectures including functions for memory, addition, multiplication, complex multiplication, subtraction, synchronization, queuing, over sampling, under sampling, adaptation, configuration, reconfiguration, control, input, output, and field programmability. As mentioned above, given the adaptability of the ACE 100, it should be apparent to those of skill in the art that the fixed and specific architectures refer to the lowest level, or most fine-grained ("leaf") level, of the ACE 100 architecture, and that such fixed architectures may themselves be adaptive, such as having a field programmable architecture.

The plurality of media functional modes include an acquisition mode, a traffic mode, and an idle mode. The acquisition mode generally includes a channel acquisition mode and a control processing mode. The traffic mode may have a variety of forms, including (1) a voice reception mode, a voice transmission mode, and a control processing mode; (2) a data reception mode, a data transmission mode, a data processing mode, and a control processing mode; (3) a media reception mode, a media transmission mode, a media processing mode, and a control processing mode. The control processing mode generally includes processing of a plurality of GSM control channels, the plurality of GSM control channels including a broadcast control channel (BCCH), a frequency-correction channel, a synchronization channel (SCH), a plurality of common control channels (CCCH), a slow associated control channels (SACCH), and a fast associated control channel (FACCH).

The interconnection network is further operative to configure the plurality of heterogeneous computational elements for media reception and transmission on a plurality of frequencies, which may be either in sequence or simultaneous, and for media reception and transmission in a plurality of time division multiple access (TDMA) time slots.

The apparatus 60 may also include a timing unit operative to provide synchronization and over sampling, a memory operative to store the first configuration information and the second configuration information, and a controller operative to direct and schedule the configuration of the plurality of heterogeneous computational elements for the first functional mode and the reconfiguration of the plurality of heterogeneous computational elements for the second functional mode. These timing, memory and controller components may themselves be comprised of a plurality of heterogeneous computational elements coupled to the interconnection network.

In the preferred embodiment, the apparatus 60 is embodied within a mobile station having a plurality of operating modes, including mobile telecommunication, personal digital assistance, multimedia reception, mobile packet-based communication, and paging.

Numerous advantages of the various embodiments of the present invention are readily apparent. The present invention provides a method and apparatus for configuration of adaptive integrated circuitry, to provide one or more operating modes or other functionality of ACE circuitry and other devices incorporating ACE technology, in which an ACE circuit (ACE IC) is utilized in a communication device, such as a cellular telephone, a GSM telephone, another type of mobile telephone or mobile station, or any other type of media communication device, including video, voice or radio, or other forms of multimedia. The adaptive integrated circuitry is configured and reconfigured for multiple tasks, such as channel acquisition, voice transmission, or multimedia and other data processing. In the preferred embodiment, the configuration and reconfiguration occurs to adaptively optimize the performance of the particular activity over time, such as to increase the speed of channel acquisition, increase throughput rates, increase perceived voice and media quality, and decrease the rate of dropped communication sessions.

Yet additional advantages of the present invention may be further apparent to those of skill in the art. The ACE 100 architecture of the present invention effectively and efficiently combines and maximizes the various advantages of processors, ASICs and FPGAs, while minimizing potential disadvantages. The ACE 100 includes the programming flexibility of a processor, the post-fabrication flexibility of FPGAs, and the high speed and high utilization factors of an ASIC. The ACE 100 is readily reconfigurable, in advance, in real-time or at other rates, and is capable of having corresponding, multiple modes of operation. In addition, through the selection of particular functions for reconfigurable acceleration, the ACE 100 minimizes power consumption and is suitable for low power applications, such as for use in handheld and other battery-powered devices.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

The invention claimed is:

1. An apparatus for adaptive multimedia transmission and reception, the apparatus comprising:
   a network interface;
   a plurality of heterogeneous computational elements, a first computational element of the plurality of heterogeneous computational elements having a first fixed architecture and a second computational element of the plurality of heterogeneous computational elements having a second, different fixed architecture; and
   an interconnection network coupled to the network interface and to the plurality of heterogeneous computational elements, the interconnection network adapted, in response to first configuration information, to configure a first plurality of input and output data connections among the plurality of heterogeneous computational elements for a first media functional mode of a plurality of media functional modes, and the interconnection network further adapted, in response to second configuration information, to configure a second plurality of input and output data connections among the plurality of heterogeneous computational elements for a second, different media functional mode of the plurality of media functional modes, the plurality of media functional modes comprising an acquisition mode and a traffic mode, the traffic mode including a voice reception mode, a voice transmission mode and a control processing mode, the control processing mode processing a plurality of GSM control channels including a broadcast control channel (BCCH), a frequency-correction channel, a synchronization channel (SCH), a plurality of common control channels (CCCH), a slow associated control channels (SACCH), and a fast associated control channel (FACCH).

2. The apparatus of claim 1, wherein the plurality of media functional modes further comprises an idle mode.

3. The apparatus of claim 1, wherein the acquisition mode includes a channel acquisition mode and a control processing mode.

4. The apparatus of claim 1, wherein the traffic mode includes a data reception mode, a data transmission mode, a data processing mode, and a control processing mode.

5. The apparatus of claim 1, wherein the traffic mode includes a media reception mode, a media transmission mode, a media processing mode, and a control processing mode.

6. The apparatus of claim 1, wherein the interconnection network is further adapted to configure a third plurality of input and output data connections among the plurality of heterogeneous computational elements for media reception on a plurality of frequencies.

7. The apparatus of claim 1, wherein the interconnection network is further adapted to configure a third plurality of input and output data connections among the plurality of heterogeneous computational elements for media reception in a plurality of time division multiple access (TDMA) time slots.

8. The apparatus of claim 1, wherein the interconnection network is further adapted to configure a third plurality of input and output data connections among the plurality of heterogeneous computational elements for media transmission on a plurality of frequencies.

9. The apparatus of claim 1, wherein the interconnection network is further adapted to configure a third plurality of input and output data connections among the plurality of heterogeneous computational elements for media transmission in a plurality of time division multiple access (TDMA) time slots.

10. The apparatus of claim 1, further comprising:
    a timing unit coupled to the network interface, to plurality of heterogeneous computational elements and to the interconnection network, the timing unit operative to provide synchronization and over sampling.

11. The apparatus of claim 10, wherein the timing unit is comprised of a plurality of heterogeneous computational elements and interconnection network.

12. The apparatus of claim 1, further comprising:
    a memory coupled to the plurality of heterogeneous computational elements and to the interconnection network, the memory operative to store the first configuration information and the second configuration information.

13. The apparatus of claim 1, wherein the first configuration information and the second configuration information are stored in a second plurality of heterogeneous computational elements configured for a memory functional mode.

14. The apparatus of claim 1, wherein the first configuration information and the second configuration information are stored as a configuration of the plurality of heterogeneous computational elements.

15. The apparatus of claim 1, wherein the first fixed architecture and the second fixed architecture are selected from a plurality of specific architectures, the plurality of specific architectures including functions for memory, addition, multiplication, complex multiplication, subtraction, synchronization, queuing, over sampling, under sampling, adaptation, configuration, reconfiguration, control, input, output, and field programmability.

16. The apparatus of claim 1, further comprising:
    a controller coupled to the plurality of heterogeneous computational elements and to the interconnection network, the controller operative to direct and schedule the configuration of the plurality of heterogeneous computational elements for the first functional mode and the reconfiguration of the plurality of heterogeneous computational elements for the second functional mode.

17. The apparatus of claim 1, further comprising:
    a second plurality of heterogeneous computational elements coupled to the interconnection network, the second plurality of heterogeneous computational elements having a third plurality of input and output data connections configured by the interconnection network for a controller operating mode, the configured second plurality of heterogeneous computational elements operative to direct and schedule the configuration of the plurality of heterogeneous computational elements by the interconnection network for the first media functional mode and the second media functional mode.

18. The apparatus of claim 1, wherein apparatus is embodied within a mobile station having a plurality of operating modes.

19. The apparatus of claim 18, wherein the plurality of operating modes of the mobile station includes mobile telecommunication, personal digital assistance, multimedia reception, mobile packet-based communication, and paging.

20. The apparatus of claim 1, wherein a first portion of the plurality of heterogeneous computational elements are operating in the first media functional mode while a second portion of the plurality of heterogeneous computational elements are being configured for the second media functional mode.

21. The apparatus of claim 1, wherein the interconnection network is further adapted to configure the first and second pluralities of input and output data connections among the plurality of heterogeneous computational elements by providing circuit-switched connections for input and output data transfer.

22. The apparatus of claim 1, wherein the interconnection network is further adapted to configure the first and second pluralities of input and output data connections among the plurality of heterogeneous computational elements by providing routing of data packets for input and output data transfer.

23. The apparatus of claim 22, wherein the data packets further comprise routing information for self-routing of the data packets.

24. The apparatus of claim 1, wherein the interconnection network further comprises a plurality of levels of interconnection, a first level of interconnection of the plurality of levels of interconnection adapted to route a plurality of data packets as the configuration of the first and second pluralities of input and output data connections.

25. The apparatus of claim 24, wherein a second level of interconnection of the plurality of levels of interconnection is adapted to provide circuit-switched connections for input and output data transfer as the configuration of the first and second pluralities of input and output data connections.

26. The apparatus of claim 1, wherein the network interface is a wireless communication network interface.

27. An adaptive integrated circuit, comprising:
a memory adapted to store configuration information;
a plurality of fixed and differing computational elements; and
an interconnection network coupled to the memory and to the plurality of fixed and differing computational elements, the interconnection network adapted, in response to configuration information, to configure a plurality of data input, data output and control communication paths among the plurality of fixed and differing computational elements for a plurality of media functional modes, the plurality of media functional modes comprising an acquisition mode and a traffic mode, the traffic mode including a voice reception mode, a voice transmission mode and a control processing mode processing a plurality of GSM control channels including a broadcast control channel (BCCH), a frequency-correction channel, a synchronization channel (SCH), a plurality of common control channels (CCCH), a slow associated control channels (SACCH), and a fast associated control channel (FACCH).

28. The adaptive integrated circuit of claim 27, wherein the plurality of media functional modes further comprises an idle mode.

29. The adaptive integrated circuit of claim 27, wherein the acquisition mode includes a channel acquisition mode and a control processing mode.

30. The adaptive integrated circuit of claim 27, wherein the traffic mode includes a data reception mode, a data transmission mode, a data processing mode, and a control processing mode.

31. The adaptive integrated circuit of claim 30, wherein the traffic mode includes a media reception mode, a media transmission mode, a media processing mode, and a control processing mode.

32. The adaptive integrated circuit of claim 27, wherein the interconnection network is further adapted to configure the plurality of data input, data output and control communication paths among the plurality of fixed and differing computational elements for media reception on a plurality of frequencies.

33. The adaptive integrated circuit of claim 27, wherein the interconnection network is further adapted to configure the plurality of data input, data output and control communication paths among the plurality of fixed and differing computational elements for media reception in a plurality of time division multiple access (TDMA) time slots.

34. The adaptive integrated circuit of claim 27, wherein the interconnection network is further adapted to configure the plurality of data input, data output and control communication paths among the plurality of fixed and differing computational elements for media transmission on a plurality of frequencies.

35. The adaptive integrated circuit of claim 27, wherein the interconnection network is further adapted to configure the plurality of data input, data output and control communication paths among the plurality of fixed and differing computational elements for media transmission in a plurality of time division multiple access (TDMA) time slots.

36. The adaptive integrated circuit of claim 27, wherein adaptive integrated circuit is embodied within a mobile station having a plurality of operating modes.

37. The adaptive integrated circuit of claim 36, wherein the plurality of operating modes of the mobile station includes mobile telecommunication, personal digital assistance, multimedia reception, mobile packet-based communication, and paging.

38. The adaptive integrated circuit of claim 27, wherein a first portion of the plurality of fixed and differing computational elements are operating in the first media functional mode while a second portion of the plurality of fixed and differing computational elements are being configured for the second media functional mode.

39. The adaptive integrated circuit of claim 27, wherein the plurality of fixed and differing computational elements are selected from a plurality of specific architectures, the plurality of specific architectures including functions for memory, addition, multiplication, complex multiplication, subtraction, synchronization, queuing, over sampling, under sampling, adaptation, configuration, reconfiguration, control, input, output, and field programmability.

40. A mobile communication apparatus for wireless communication within a wireless network,comprising:
a network interface for wireless communication with a base station transceiver;
a memory adapted to store configuration information;

a plurality of fixed and differing computational elements; and an interconnection network coupled to the network interface, to the memory and to the plurality of fixed and differing computational elements, the interconnection network adapted, in response to configuration information, to configure a plurality of data input, data output and control communication paths among the plurality of fixed and differing computational elements for a plurality of media functional modes, the plurality of media function modes including a traffic mode having a voice reception mode, a voice transmission mode, and a control processing mode, the control processing mode processing a plurality of GSM control channels including a broadcast control channel (BCCH), a frequency-correction channel, a synchronization (SCH), a plurality of common control channels (CCCH), a slow associated control channels (SACCH), and a fast associated control channel (FACCH).

41. The apparatus of claim 40, wherein the plurality of media functional modes comprises an acquisition mode and a traffic mode.

42. The apparatus of claim 41, wherein the acquisition mode comprises a channel acquisition mode and a control processing mode.

43. The apparatus of claim 41, wherein the traffic mode comprises a voice reception mode, a voice transmission mode, and a control processing mode.

44. The apparatus of claim 40, wherein the interconnection network is further adapted to configure the plurality of data input, data output and control communication paths among the plurality of heterogeneous computational elements by providing circuit-switched connections for corresponding transfer of data input, data output and control information.

45. The apparatus of claim 40, wherein the interconnection network is further adapted to configure the plurality of data input, data output and control communication paths among the plurality of heterogeneous computational elements by providing routing of data packets for corresponding transfer of data input, data output and control information.

* * * * *